US009310121B2

(12) United States Patent
Bonet

(10) Patent No.: US 9,310,121 B2
(45) Date of Patent: Apr. 12, 2016

(54) HIGH PERFORMANCE REFRIGERATOR HAVING SACRIFICIAL EVAPORATOR

(71) Applicant: Thermo Fisher Scientific (Asheville) LLC, Asheville, NC (US)

(72) Inventor: Jose R. Bonet, Candler, NC (US)

(73) Assignee: Thermo Fisher Scientific (Asheville) LLC, Asheville, NC (US)

( * ) Notice: Subject to any disclaimer, the term of this patent is extended or adjusted under 35 U.S.C. 154(b) by 456 days.

(21) Appl. No.: 13/652,979

(22) Filed: Oct. 16, 2012

(65) Prior Publication Data

US 2013/0098077 A1    Apr. 25, 2013

Related U.S. Application Data

(60) Provisional application No. 61/548,805, filed on Oct. 19, 2011.

(51) Int. Cl.
*F25D 21/00*     (2006.01)
*F25D 21/08*     (2006.01)
(Continued)

(52) U.S. Cl.
CPC . *F25D 21/08* (2013.01); *F25B 5/02* (2013.01); *F25D 17/045* (2013.01); *F25B 5/04* (2013.01);
(Continued)

(58) Field of Classification Search
CPC .... F25B 5/04; F25B 21/08; F25B 2317/0655; F25B 2317/0665; F25B 2317/06744; F25B 2400/0409; F25B 2600/112; F25D 17/045; F25D 17/06; F25D 17/062; F25D 17/065; F25D 17/067; F25D 21/08; F25D 2317/0655; F25D 2317/0665; F25D 2317/067

USPC ............... 62/80, 273, 408, 419, 524, 526, 89, 62/275–276, 151, 154, 187, 417
See application file for complete search history.

(56) References Cited

U.S. PATENT DOCUMENTS 2,330,913 A * 10/1943 Philipp ........................... 62/288
2,758,150 A      8/1956 Zargarpur
(Continued)

FOREIGN PATENT DOCUMENTS

CN          85109092 A    8/1986
CN           1167243 A   12/1997
(Continued)

OTHER PUBLICATIONS

Great Britian Intellectual Property Office, Examination Report under Section 18(3) issued in copending Great Britian Patent Application No. 1218351.3 (May 21, 2014) (1 page).
(Continued)

*Primary Examiner* — Frantz Jules
*Assistant Examiner* — Jose O Class-Quinones
(74) *Attorney, Agent, or Firm* — Wood, Herron & Evans, LLP

(57) ABSTRACT

A high performance refrigerator includes a cabinet with a refrigerated interior and a refrigeration fluid circuit having first and second evaporators located within the cabinet and separated from the refrigerated interior by an insulating cover. The refrigerator also includes a first damper controlling flow from the refrigerated interior into the first evaporator, a second damper controlling flow from the first evaporator to the second evaporator, and a third damper controlling flow from the second evaporator to the refrigerated interior. The first evaporator operates with refrigerant at a lower temperature than the second evaporator such that substantially all frost formed on the first and second evaporators is collected on a first evaporator coil in the first evaporator. Thus, the first evaporator acts as a sacrificial evaporator that undergoes defrost more frequently than the second evaporator.

18 Claims, 11 Drawing Sheets

(51) Int. Cl.
  *F25B 5/02* (2006.01)
  *F25D 17/04* (2006.01)
  *F25B 5/04* (2006.01)

(52) U.S. Cl.
  CPC ... *F25B 2400/0409* (2013.01); *F25B 2600/112* (2013.01); *F25D 2317/0655* (2013.01); *F25D 2317/0665* (2013.01); *Y02B 30/743* (2013.01)

(56) References Cited

U.S. PATENT DOCUMENTS

| | | | | |
|---|---|---|---|---|
| 2,769,319 A * | 11/1956 | Alsing | | 62/287 |
| 2,807,149 A * | 9/1957 | Williams, Jr. | | 62/152 |
| 2,876,630 A * | 3/1959 | Boling | | 62/234 |
| 3,022,639 A | 2/1962 | Brown et al. | | |
| 3,070,973 A | 1/1963 | O'Connell | | |
| 3,156,102 A * | 11/1964 | Costantini et al. | | 62/237 |
| 3,381,494 A * | 5/1968 | Steelman | | 62/283 |
| 3,537,274 A * | 11/1970 | Tilney | | 62/324.1 |
| 3,733,841 A | 5/1973 | Gelbard | | |
| 3,784,785 A | 1/1974 | Noland | | |
| 3,875,758 A | 4/1975 | Fischer | | |
| 4,122,687 A | 10/1978 | McKee | | |
| 4,270,364 A * | 6/1981 | Oonishi et al. | | 62/198 |
| 4,474,026 A | 10/1984 | Mochizuki et al. | | |
| 4,513,581 A * | 4/1985 | Mizobuchi et al. | | 62/197 |
| 4,537,041 A | 8/1985 | Denpou et al. | | |
| 4,633,677 A | 1/1987 | Maehara | | |
| 4,691,527 A | 9/1987 | Ikeda | | |
| 4,920,764 A * | 5/1990 | Martin | | 62/259.1 |
| 4,928,501 A * | 5/1990 | Negishi | | 62/406 |
| 4,945,732 A | 8/1990 | Haruyama et al. | | |
| 4,964,281 A * | 10/1990 | Tanaka | | 62/256 |
| 4,976,116 A | 12/1990 | Hayama et al. | | |
| 5,082,335 A * | 1/1992 | Cur et al. | | 312/401 |
| 5,157,943 A | 10/1992 | Jaster et al. | | |
| 5,220,807 A | 6/1993 | Bourne et al. | | |
| 5,228,308 A | 7/1993 | Day et al. | | |
| 5,255,536 A | 10/1993 | Jung et al. | | |
| 5,285,652 A | 2/1994 | Day | | |
| 5,309,725 A | 5/1994 | Cayce | | |
| 5,315,835 A * | 5/1994 | Park | | 62/80 |
| 5,402,656 A | 4/1995 | Jaster et al. | | |
| 5,406,805 A | 4/1995 | Radermacher et al. | | |
| 5,460,010 A | 10/1995 | Kobayashi et al. | | |
| 5,531,078 A | 7/1996 | Day et al. | | |
| 5,694,782 A | 12/1997 | Alsenz | | |
| 5,735,131 A | 4/1998 | Lambright, Jr. et al. | | |
| 5,758,510 A | 6/1998 | Cho | | |
| 5,816,054 A | 10/1998 | Yoo et al. | | |
| 5,826,438 A | 10/1998 | Ohishi et al. | | |
| 5,832,738 A | 11/1998 | Shin | | |
| 5,887,440 A | 3/1999 | Dube | | |
| 5,901,570 A | 5/1999 | Sin | | |
| 5,987,904 A | 11/1999 | Kim et al. | | |
| 6,000,231 A | 12/1999 | Alsenz | | |
| 6,105,387 A | 8/2000 | Hong et al. | | |
| 6,253,561 B1 | 7/2001 | Imakubo | | |
| 6,318,107 B1 | 11/2001 | Pandaru et al. | | |
| 6,370,895 B1 | 4/2002 | Sakuma et al. | | |
| 6,370,908 B1 | 4/2002 | James | | |
| 6,385,983 B1 | 5/2002 | Sakki et al. | | |
| 6,389,833 B1 | 5/2002 | Bouloy | | |
| 6,418,741 B1 | 7/2002 | Nungesser et al. | | |
| 6,427,463 B1 | 8/2002 | James | | |
| 6,490,878 B1 | 12/2002 | Luminet et al. | | |
| 6,543,245 B1 | 4/2003 | Waldschmidt et al. | | |
| 6,578,376 B2 | 6/2003 | Thurman | | |
| 6,609,390 B1 | 8/2003 | Ueno et al. | | |
| 6,622,498 B2 | 9/2003 | Park et al. | | |
| 6,655,170 B2 | 12/2003 | Holz et al. | | |
| 6,691,527 B2 | 2/2004 | Bureau et al. | | |
| 6,715,305 B2 | 4/2004 | Doi et al. | | |
| 6,739,146 B1 * | 5/2004 | Davis et al. | | 62/155 |
| 6,775,998 B2 | 8/2004 | Yuasa et al. | | |
| 6,786,056 B2 | 9/2004 | Bash et al. | | |
| 6,923,014 B2 | 8/2005 | Goth et al. | | |
| 7,051,539 B2 | 5/2006 | Jung et al. | | |
| 7,137,266 B2 * | 11/2006 | Kim et al. | | 62/198 |
| 7,213,407 B2 | 5/2007 | Hu | | |
| 7,367,200 B2 | 5/2008 | Ikegami et al. | | |
| 7,448,226 B2 | 11/2008 | Yamashita et al. | | |
| 7,461,515 B2 | 12/2008 | Wellman | | |
| 7,506,520 B2 | 3/2009 | Oh | | |
| 7,610,766 B2 | 11/2009 | Dube | | |
| 7,614,249 B2 | 11/2009 | Hu | | |
| 7,698,902 B2 | 4/2010 | Kang et al. | | |
| 7,703,298 B2 | 4/2010 | Lee et al. | | |
| 7,739,881 B2 | 6/2010 | Matsunaga et al. | | |
| 7,757,514 B2 | 7/2010 | Oshitani et al. | | |
| 7,997,331 B2 | 8/2011 | Oomura et al. | | |
| 8,104,306 B1 | 1/2012 | Elsner | | |
| 8,341,970 B2 | 1/2013 | Ouchi et al. | | |
| 8,459,049 B2 | 6/2013 | Li | | |
| 8,511,102 B2 | 8/2013 | Feng et al. | | |
| 8,511,109 B2 | 8/2013 | Kuehl et al. | | |
| 2002/0184900 A1 | 12/2002 | Wellman | | |
| 2003/0163999 A1 | 9/2003 | Bennett et al. | | |
| 2004/0107727 A1 | 6/2004 | Kim et al. | | |
| 2004/0139763 A1 | 7/2004 | Jeong et al. | | |
| 2005/0039472 A1 | 2/2005 | Cushman et al. | | |
| 2005/0086965 A1 | 4/2005 | Lalumiere et al. | | |
| 2005/0126198 A1 | 6/2005 | Marchand et al. | | |
| 2006/0117768 A1 | 6/2006 | Lee et al. | | |
| 2007/0000271 A1 * | 1/2007 | Lee et al. | | 62/276 |
| 2007/0033962 A1 | 2/2007 | Kang et al. | | |
| 2007/0074524 A1 | 4/2007 | Tupis et al. | | |
| 2008/0016889 A1 * | 1/2008 | Jung | | 62/187 |
| 2008/0104973 A1 | 5/2008 | Hall et al. | | |
| 2008/0148745 A1 | 6/2008 | Zhang et al. | | |
| 2008/0156034 A1 | 7/2008 | Cur et al. | | |
| 2008/0196866 A1 | 8/2008 | Wu et al. | | |
| 2009/0019881 A1 | 1/2009 | Rafalovich et al. | | |
| 2009/0113923 A1 | 5/2009 | Young | | |
| 2009/0133432 A1 | 5/2009 | Lee et al. | | |
| 2009/0133436 A1 | 5/2009 | Boiarski et al. | | |
| 2009/0173092 A1 | 7/2009 | Hu | | |
| 2009/0199586 A1 | 8/2009 | Soysal et al. | | |
| 2009/0217684 A1 | 9/2009 | Ouchi et al. | | |
| 2010/0011801 A1 | 1/2010 | Ritchie et al. | | |
| 2010/0100243 A1 | 4/2010 | Lee et al. | | |
| 2010/0126200 A1 | 5/2010 | Oh et al. | | |
| 2010/0139230 A1 * | 6/2010 | Jeong et al. | | 62/186 |
| 2010/0139309 A1 * | 6/2010 | Kim et al. | | 62/419 |
| 2010/0192609 A1 | 8/2010 | Chae et al. | | |
| 2010/0192617 A1 | 8/2010 | Chae et al. | | |
| 2010/0205984 A1 | 8/2010 | Gu et al. | | |
| 2010/0242505 A1 | 9/2010 | Thybo et al. | | |
| 2010/0287961 A1 | 11/2010 | Song et al. | | |
| 2010/0300137 A1 | 12/2010 | Lim et al. | | |
| 2010/0326116 A1 | 12/2010 | Kwon | | |
| 2011/0011104 A1 | 1/2011 | Lesage et al. | | |
| 2011/0011109 A1 | 1/2011 | Rafalovich et al. | | |
| 2011/0011119 A1 | 1/2011 | Kuehl et al. | | |
| 2011/0041525 A1 | 2/2011 | Kim et al. | | |
| 2011/0209490 A1 | 9/2011 | Mijanovic et al. | | |
| 2011/0315783 A1 | 12/2011 | Baker et al. | | |
| 2012/0011884 A1 | 1/2012 | Cho et al. | | |
| 2012/0174604 A1 | 7/2012 | Thogersen et al. | | |
| 2013/0055742 A1 | 3/2013 | Ouchi et al. | | |
| 2013/0186129 A1 | 7/2013 | Bae et al. | | |

FOREIGN PATENT DOCUMENTS

| | | |
|---|---|---|
| CN | 1204037 A | 1/1999 |
| CN | 1289033 A | 3/2001 |
| CN | 1453540 A | 11/2003 |
| CN | 101151496 A | 3/2008 |
| CN | 101435647 A | 5/2009 |
| CN | 101520272 A | 9/2009 |
| CN | 101571339 A | 11/2009 |
| CN | 101619916 A | 1/2010 |
| CN | 201427542 Y | 3/2010 |
| CN | 101934755 A | 1/2011 |

(56) References Cited

FOREIGN PATENT DOCUMENTS

| CN | 201066224 Y | 5/2015 |
|---|---|---|
| DE | 4305476 A1 | 8/1993 |
| DE | 202005021335 U1 | 8/2007 |
| DK | 165650 B | 12/1992 |
| EP | 0541172 A2 | 5/1993 |
| EP | 0687873 A2 | 12/1995 |
| EP | 0696893 A1 | 2/1996 |
| EP | 1628108 A2 | 2/2006 |
| GB | 2164133 A | 3/1986 |
| GB | 2496948 B | 10/2014 |
| JP | 52-131244 A | 11/1977 |
| JP | 09-210536 A | 8/1997 |
| JP | H09210536 A | 8/1997 |
| JP | 2002031466 A | 1/2002 |
| SE | 463381 B | 11/1990 |
| WO | 2006104936 A2 | 10/2006 |
| WO | 2010/087572 A2 | 8/2010 |

OTHER PUBLICATIONS

Great Britian Intellectual Property Office, Certificate of Grant of Patent issued in copending Great Britian Patent Application No. 1218351.3 (Oct. 15, 2014) (2 pages).

Chinese Patent Office, First Office Action in CN Application No. 201210399155.8, Oct. 31, 2014 (3 pages).

Chinese Patent Office, First Office Action and Search Report in CN Application No. 201210398635.2, Nov. 2, 2014 (11 pages).

Chinese Patent Office, English Translation of the First Office Action in CN Application No. 201210399155.8, Oct. 31, 2014 (2 pages).

Chinese Patent Office, English Translation of the First Office Action and Search Report in CN Application No. 201210398635.2, Nov. 2, 2014 (10 pages).

United Kingdom Intellectual Property Office, Patents Act 1977: Combined Search and Examination Report dated Mar. 21, 2013, for corresponding International Patent Application No. GB1218351.3 (7 pages).

United Kingdom Intellectual Property Office, Patents Act 1977: Combined Search and Examination Report dated Mar. 21, 2013, for corresponding International Patent Application No. GB1218364.6 (7 pages).

United Kingdom Intellectual Property Office, Patents Act 1977: Combined Search and Examination Report dated Mar. 21, 2013, for corresponding International Patent Application No. GB1218348.9 (7 pages).

Chinese Patent Office, First Office Action in CN Application No. 201210400955.7, Jan. 6, 2015, and English language translation thereof.

Chinese Patent Office, Second Office Action in CN Application No. 201210398635.2, May 6, 2015, and English language translation thereof.

Chinese Patent Office, Second Office Action in CN Application No. 201210399155.8, May 11, 2015, and English language translation thereof.

* cited by examiner

HIGH PERFORMANCE REFRIGERATOR HAVING SACRIFICIAL EVAPORATOR

CROSS-REFERENCE TO RELATED APPLICATION

The present application claims the priority benefit of U.S. Provisional Patent Application No. 61/548,805 (pending), filed Oct. 19, 2011, the disclosure of which is hereby incorporated by reference in its entirety herein.

FIELD OF THE INVENTION

The present invention relates generally to refrigerators or freezers and, more particularly, to refrigeration systems for use with high performance blood bank refrigerators or plasma freezers.

BACKGROUND OF THE INVENTION

Refrigeration systems are known for use with laboratory refrigerators and freezers of the type known as "high performance refrigerators," which are used to cool their interior storage spaces to relative low temperatures such as about −30° C. or lower, for example. These high performance refrigerators are used to store blood and/or plasma, in one example.

Known refrigeration systems of this type include a single loop circulating a refrigerant. The system transfers energy (i.e., heat) from the refrigerant to the surrounding environment through a condenser, and the system transfers heat energy to the refrigerant from the cooled space (e.g., a cabinet interior) through an evaporator. The refrigerant is selected to vaporize and condense at a selected temperature close to the desired temperature for the cooled space, such that the refrigeration system can maintain the cooled space near that selected temperature during operation.

One common problem with known refrigeration systems is that the evaporator includes coils that tend to produce and accumulate frost along the outer surface if any moisture is ambient within the cooled space. If enough frost accumulation occurs, the ability of the evaporator to remove heat from the cooled space is detrimentally impacted. Consequently, known refrigeration systems require a defrost cycle where the evaporator coils are heated to remove the frost. This defrost cycle may be a manual defrost or an automatic defrost, but both types of defrost cycles are undesirable for various reasons.

In a manual defrost cycle, all of the products stored in the cabinet are removed and the cooled space is left exposed to the ambient environment to heat up the evaporator coils and melt the frost. This cycle is undesirable because the products stored in the cabinet need to be stored in an alternative refrigerator for the duration of the defrost cycle, and also because the melting process can produce a significant amount of moisture that needs to be removed from the cabinet. In an automatic defrost cycle, the evaporator coils are rapidly heated by a local heating unit or hot gas flow to remove the frost, which is collected by a trough and delivered out of the cooled space. The cooled space necessarily undergoes a temperature spike during this automatic defrost cycle, which can jeopardize the products stored in the cabinet.

There is a need, therefore, for a refrigerator that substantially minimizes or eliminates a temperature spike within the cooled space during a defrost cycle.

SUMMARY OF THE INVENTION

In one embodiment, a refrigerator includes a cabinet with a refrigerated interior and a refrigeration fluid circuit for circulating a refrigerant. The refrigeration fluid circuit includes a compressor, a condenser, an expansion device, a first evaporator located within the cabinet, and a second evaporator located within the cabinet. The first evaporator includes a first evaporator coil and a first evaporator fan producing air flow through the first evaporator coil. The second evaporator includes a second evaporator coil and a second evaporator fan producing air flow through the second evaporator coil. The refrigerator also includes an insulating cover separating the refrigerated interior from a first evaporator compartment containing the first evaporator and a second evaporator compartment containing the second evaporator. The refrigerator further includes at least one first damper that opens to permit air circulation from the refrigerated interior into the first evaporator compartment, a second damper that opens to permit air circulation from the first evaporator compartment to the second evaporator compartment, and at least one third damper that opens to permit air circulation from the second evaporator compartment to the refrigerated interior. The first evaporator operates with refrigerant at a colder temperature than the second evaporator, thereby enabling the first evaporator to collect substantially all frost that forms on the first and second evaporator coils during cooling of the refrigerated interior.

In one aspect, the first evaporator includes a first defrost heater and the second evaporator includes a second defrost heater. The refrigerator further includes a controller operable to command the refrigerator to perform a series of steps defining a defrost cycle when the first evaporator requires defrosting. In this regard, the first evaporator includes a first defrost heater. The series of steps includes stopping operation of the first evaporator fan, closing the first and second dampers to isolate the first evaporator compartment from the refrigerated interior, and starting operation of the first defrost heater. The controller is also operable to command the refrigerator to perform a second series of steps when both the first and second evaporators require defrosting. The second series of steps includes stopping operation of the first and second evaporator fans, closing the first, second, and third dampers to isolate the first and second evaporator compartments from the refrigerated interior, and starting operation of the first and second defrost heaters.

In another aspect, the at least one first damper includes an inlet first damper which permits air flow into the first evaporator from the refrigerated interior when open, and an outlet first damper which permits air flow from the first evaporator into the refrigerated interior when open. The inlet and outlet first dampers may open to enable the first evaporator to continue cooling the refrigerated interior while the second evaporator is defrosted. Additionally, the at least one second damper includes an inlet second damper which permits air flow into the second evaporator from the refrigerated interior when open, and an outlet second damper which permits air flow from the second evaporator into the refrigerated interior when open. The inlet and outlet second dampers may open to enable the second evaporator to continue cooling the refrigerated interior while the first evaporator is defrosted.

In another embodiment of the invention, a method of operating a refrigerator is provided, the refrigerator including a cabinet with a refrigerated interior and a refrigeration fluid circuit. The refrigeration fluid circuit includes a compressor, a condenser, a first evaporator located within the cabinet and having a first evaporator fan, a second evaporator located within the cabinet and having a second evaporator fan. The refrigerator also includes a first damper selectively permitting air circulation from the refrigerated interior into the first evaporator, a second damper selectively permitting air circulation from the first evaporator into the second evaporator, and a third damper selectively permitting air circulation from the second evaporator into the refrigerated interior. The method includes opening the first, second, and third dampers and generating air flow with the first and second evaporator fans to cool the refrigerated interior with the first and second evaporators. The first evaporator is supplied with refrigerant at a lower temperature than the second evaporator such that the first evaporator collects substantially all frost that forms on the first and second evaporators to reduce a required frequency of defrost cycles for the second evaporator.

When the first evaporator requires defrosting, the method includes stopping operation of the first evaporator fan, closing the first and second dampers to isolate the first evaporator from the refrigerated interior, and starting operation of the first defrost heater. When the first and second evaporators require defrosting, the method includes stopping operation of the first and second evaporator fans, closing the first, second, and third dampers to isolate the first and second evaporators from the refrigerated interior, and starting operation of the first and second defrost heaters.

BRIEF DESCRIPTION OF THE DRAWINGS

The accompanying drawings, which are incorporated in and constitute a part of this specification, illustrate an embodiment of the invention and, together with a general description of the invention given above, and the detailed description of the embodiment given below, serve to explain the principles of the invention.

DETAILED DESCRIPTION

Figure 1:
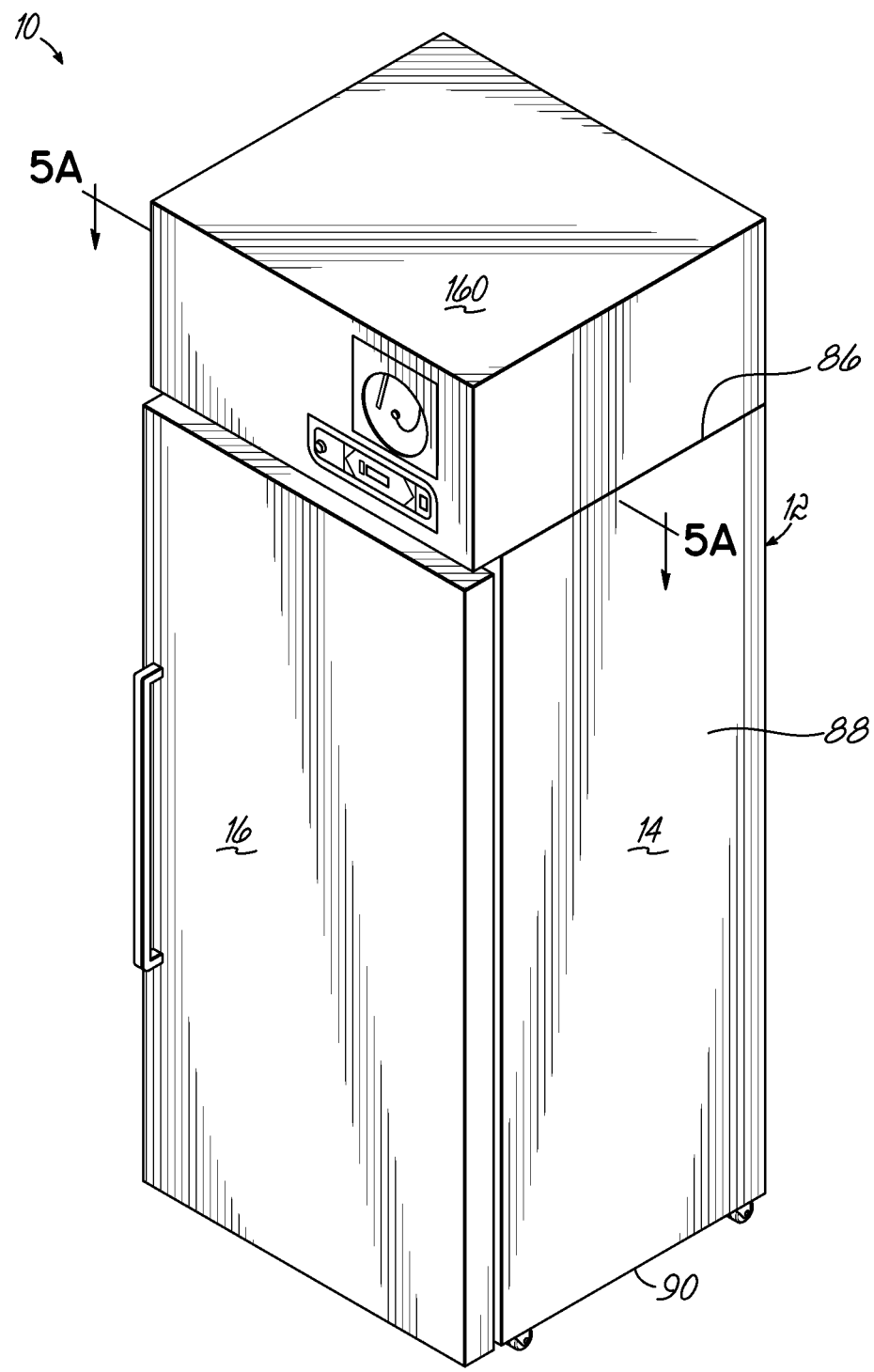
FIG. 1 is a perspective view of a refrigerator including a sacrificial evaporator according to an exemplary embodiment.

With reference to the figures, and more specifically to FIG. 1, an exemplary high performance refrigerator 10 according to one embodiment of the present invention is illustrated. Although the terms "high performance refrigerator" and "refrigerator" are used throughout the specification, it will be understood that the invention encompasses any type of cooling device, including a refrigerator that comprises a freezer. The refrigerator of FIG. 1 includes a cabinet 12 for storing items that require cooling to temperatures of about −30° C. or lower, for example. The cabinet 12 includes a cabinet housing 14 defining a generally rectangular cross-section and a door 16 providing access into an interior 18 of the cabinet 12. The cabinet 12 supports one or more components that jointly define a single-stage refrigeration fluid circuit 20 (FIGS. 2A and 2B) that thermally interacts with the air within the cabinet 12 to cool the interior 18 thereof. In this regard, the refrigeration fluid circuit 20 described in further detail below interacts with warmed air in the interior 18 and cools this air to maintain a desired cold temperature in the cabinet 12.

Figure 2A:
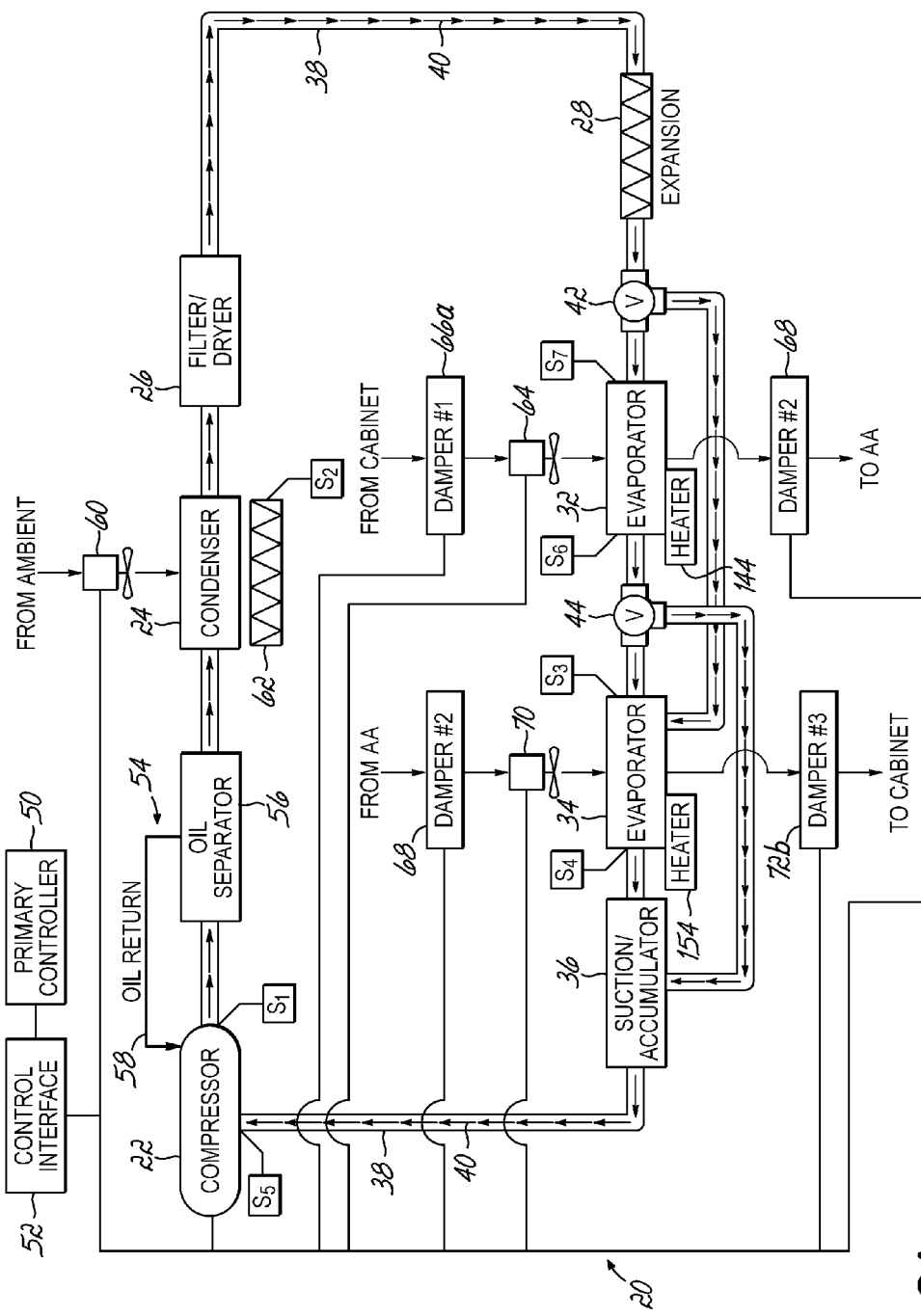
FIG. 2A is a schematic representation of one embodiment of the refrigeration fluid circuit used with the refrigerator of FIG. 1.

With reference to FIG. 2A, details of one exemplary refrigeration fluid circuit 20 are illustrated. The refrigeration fluid circuit 20 includes, in sequence, a compressor 22, a condenser 24, a filter/dryer 26, an expansion device 28, a first evaporator 32 and a second evaporator 34 in series, and a suction/accumulator 36. Each of these elements of the refrigeration fluid circuit 20 is coupled by piping or tubing 38 configured to circulate the refrigerant 40 passing through the refrigeration fluid circuit 20. A plurality of sensors $S_1$ through $S_7$ are arranged to sense different conditions of the fluid circuit 20 and/or properties of the refrigerant (shown by arrows 40) at various locations within the fluid circuit 20. Each of these sensors $S_1$ through $S_7$ is operatively coupled to a controller 50 accessible through a controller interface 52, which permits controlling of the operation of the fluid circuit 20. It will be appreciated that more or fewer sensors may be provided than the number shown in the exemplary embodiment of the fluid circuit 20.

The refrigeration fluid circuit 20 is configured to circulate the refrigerant 40 between the condenser 24 and the first and second evaporators 32, 34. Generally speaking, heat energy in the refrigerant 40 is transferred to ambient air outside the cabinet 12 at the condenser 24. Heat energy is removed from the interior 18 of the cabinet 12 and transferred to the refrigerant 40 at the first and second evaporators 32, 34. Thus, circulating the refrigerant 40 through the fluid circuit 20 continuously removes heat energy from the interior 18 to maintain a desired internal temperature, such as, for example −30° C. In this embodiment, the refrigerant 40 passes through the first evaporator 32 before the second evaporator 34 and therefore the refrigerant 40 is at a colder temperature in the first evaporator 32. This different in temperature is advantageous for reasons set forth below.

The refrigerant 40 enters the compressor 22 in a vaporized state and is compressed to a higher pressure and higher temperature gas in the compressor 22. The fluid circuit 20 of this exemplary embodiment also includes an oil loop 54 for lubricating the compressor 22. Specifically, the oil loop 54 includes an oil separator 56 in fluid communication with piping 38 downstream of the compressor 22 and an oil return line 58 directing oil back into the compressor 22. It will be understood that the oil loop 54 may be omitted in some embodiments of the fluid circuit 20.

Upon leaving the compressor 22, the vaporized refrigerant 40 travels to the condenser 24. A fan 60 controlled by the control interface 52 directs ambient air across the condenser 24 and through a filter 62 so as to facilitate the transfer of heat from the refrigerant 40 to the surrounding environment. The air flow through the condenser 24 is shown by arrows in FIG. 2A. The refrigerant 40 condenses within the condenser 24 as a result of this heat transfer. The liquid-phase refrigerant 40 then passes through the filter/dryer 26 and the expansion device 28. In this embodiment, the expansion device 28 is in the form of a capillary tube 28 leading to the first evaporator 32, although it is contemplated that it could instead take another form such as, and without limitation, corresponding expansion valves (not shown). Additionally, the expansion device 28 could alternatively be located downstream of a first bypass valve 42 disposed between the filter/dryer 26 and the first evaporator 32 in other embodiments within the scope of the invention. The expansion device 28 causes a pressure drop in the refrigerant 40 immediately before the refrigerant 40 enters the first and second evaporators 32, 34.

As shown in FIG. 2A, the refrigeration fluid circuit 20 further includes the first bypass valve 42 and a second bypass valve 44 for selectively controlling flow of the refrigerant 40 to the first and second evaporators 32, 34. The first bypass valve 42 is located between the expansion device 28 and the first evaporator 32. The first bypass valve 42 is operable to permit refrigerant 40 flow into the first evaporator 32 or alternatively, to route the refrigerant 40 so as to bypass the first evaporator 32 and enter the second evaporator 34. The second bypass valve 44 is disposed between the first evaporator 32 and the second evaporator 34. The second bypass valve 44 is operable to direct refrigerant 40 flowing out of the first evaporator 32 either to the second evaporator 34 or so as to bypass the second evaporator 34 and be delivered directly to the suction/accumulator 36. In this regard, the first and second bypass valves 42, 44 are three-way valves that enable the controller 50 to selectively deliver refrigerant 40 to one or both of the first and second evaporators 32, 34. It will be understood that one or both of the bypass valves 42, 44 may be omitted in other embodiments within the scope of the invention.

In each of the first and second evaporators 32, 34, the refrigerant 40 receives heat from the interior 18 through a plurality of evaporator coils (not shown in FIG. 2A). A first evaporator fan 64 controlled by the control interface 52 forces air flow from the interior 18 of the cabinet 12 through the evaporator coils of the first evaporator 32 when at least one first damper 66a is opened. Similarly, a second evaporator fan 70 controlled by the control interface 52 forces air flow from the interior 18 of the cabinet 12 through the evaporator coils of the second evaporator 34 when a second damper 68 and at least one third damper 72b are opened. The plurality of first, second, and third dampers 66a, 66b, 68, 72a, 72b are described in further detail below with reference to FIGS. 5A-8B and are also controlled by the control interface 52. By virtue of the lowered pressure and the heat transfer from the cabinet 12, the refrigerant 40 vaporizes within the first and second evaporators 32, 34. The vaporized refrigerant 40 is then directed to the suction/accumulator device 36. The suction/accumulator 36 passes the refrigerant 40 in gaseous form to the compressor 22, while also accumulating excessive amounts of the refrigerant 40 in liquid form and feeding it to the compressor 22 at a controlled rate.

As briefly noted above, the refrigerant 40 delivered to the first evaporator 32 is generally at a lower temperature than the refrigerant 40 delivered to the second evaporator 34. As a result, any moisture that may be in the warm air flowing from the refrigerated interior 18 tends to collect as frost on the evaporator coils of substantially only the first evaporator 32 during operation of both evaporators 32, 34. To this end, the first evaporator 32 operates as a sacrificial evaporator by collecting substantially all moisture in the air flow so that the second evaporator 34 rarely requires defrosting. Thus, the second evaporator 34 is operable to continue cooling the refrigerated interior 18 almost continuously, even during defrost cycles for the first evaporator 32. The control of the evaporators 32, 34 and the dampers 66a, 66b, 68, 72a, 72b during these defrost cycles is described in further detail below.

The refrigerant 40 used in the refrigeration fluid circuit 20 may be chosen based on several factors, including the expected operating temperature within the cabinet 12 and the boiling point and other characteristics of the refrigerant 40. For example, in refrigerators with an expected cabinet temperature of about −30° C., an exemplary refrigerant 40 suitable for the presently described embodiment includes refrigerants commercially available under the respective designations R404A. Moreover, in specific embodiments, the refrigerant 40 may be combined with an oil to facilitate lubrication of the compressor 22. For example, and without limitation, the refrigerant 40 may be combined with Mobil EAL Arctic 32 oil. It will be understood that the precise arrangement of the components illustrated in the figures is intended to be merely exemplary rather than limiting.

Figure 2B:
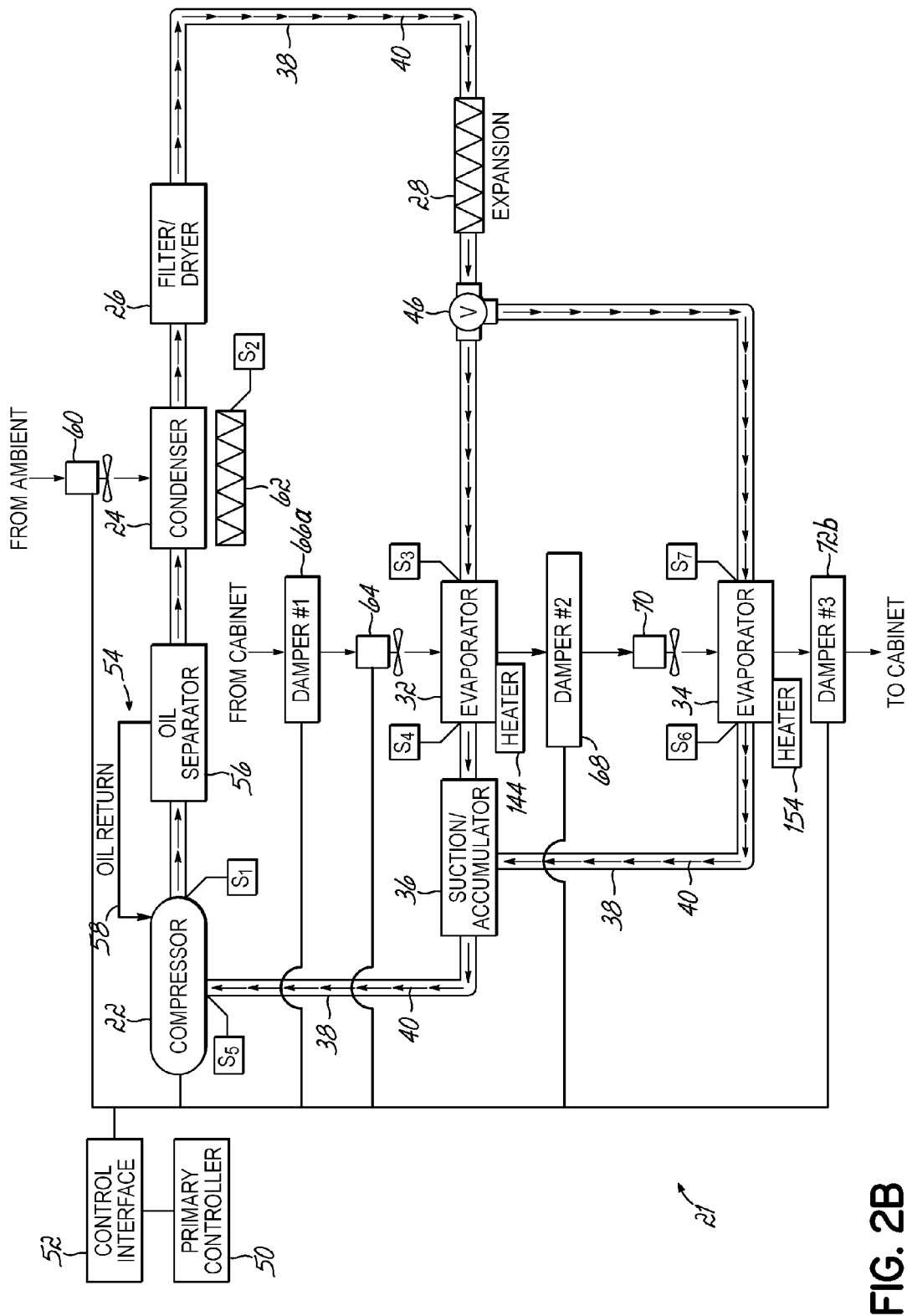
FIG. 2B is a schematic representation of another embodiment of the refrigeration fluid circuit used with the refrigerator of FIG. 1.

With reference to FIG. 2B, an alternative embodiment of a refrigeration fluid circuit 21 is shown. The refrigeration fluid circuit 21 of this embodiment includes many of the elements as the previously-described circuit 20, and those elements are numbered with the same reference numbers and are not described in detail where the operation is the same as above. The primary difference in this embodiment of the refrigeration fluid circuit 21 is that the first and second evaporators 32, 34 are arranged in parallel to one another in the loop defined by the piping 38 rather than being in series as shown in the circuit 20 of FIG. 2A. Moreover, the bypass valves 42, 44 have been replaced by a single three-way valve 46 that selectively delivers the refrigerant 40 from the expansion device 28 to one or both of the first and second evaporators 32, 34. Although the first, second, and third dampers 66a, 68, 72b operate in a similar manner as above, the air flow through the evaporators 32, 34 follows a clear path through each evaporator 32, 34 as shown in FIG. 2B. The refrigerant 40 that passes through each evaporator 32, 34 is then collected by the suction/accumulator 36 for return to the compressor 22. As discussed in connection with the previous embodiment, the refrigerant 40 supplied to the first evaporator 32 is at a lower temperature than the refrigerant 40 supplied to the second evaporator 34, thereby making the first evaporator 32 a sacrificial evaporator for collecting frost. The temperature of the refrigerant 40 may be modified after being split by the three-way valve 46 by one or more additional heaters or heat exchangers not shown in the current drawings in order to operate within the scope of the invention. In all other aspects, the second embodiment of the refrigeration fluid circuit 21 (FIG. 2B) is exactly the same as the first refrigeration fluid circuit 20 (FIG. 2A).

Figure 3:
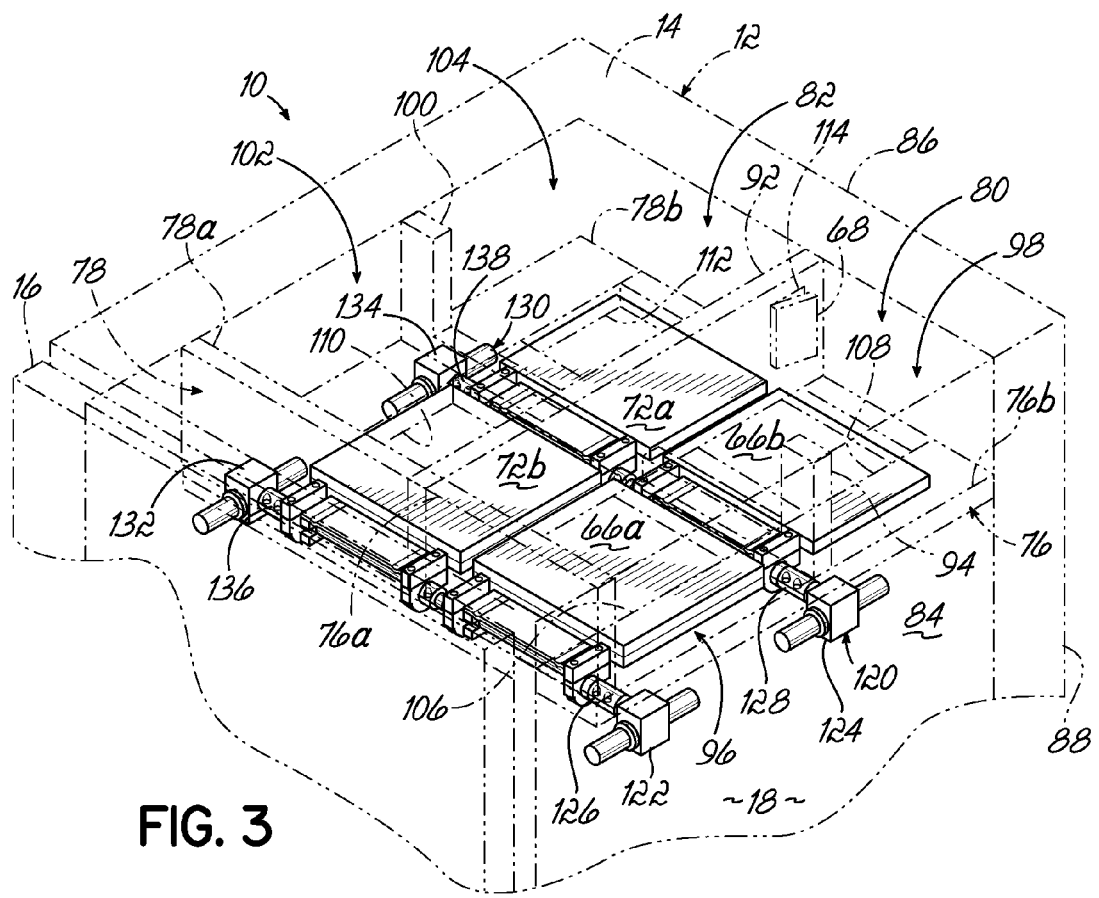
FIG. 3 is a perspective view of an evaporator cover (shown in phantom) and dampers used with the refrigerator of FIG. 1.

With reference to FIGS. 3-8B and in particular FIG. 3, the refrigerator 10 includes an insulated cover defined by a first evaporator cover 76 and a second evaporator cover 78 that collectively divide the interior 18 of the cabinet 12 into a first evaporator compartment 80, a second evaporator compartment 82, and a refrigerated interior portion 84. The first and second evaporator covers 76, 78 are coupled to one or more of the top wall 86, the side walls 88 (which includes rear wall 88), and/or the bottom wall 90 collectively defining the cabinet housing 14. More particularly, the first evaporator cover 76 is coupled to the top wall 86 and the side walls 88 of the cabinet housing 14 to thermally isolate the first and second evaporator compartments 80, 82 from the heat energy within the interior 18 as that heat energy rises within the interior 18 of the cabinet 12. The first evaporator cover 76 includes a vertical panel portion 76a extending downwardly from the top wall 86 of the cabinet housing 14 and a horizontal panel portion 76b extending between the vertical panel portion 76a and the side walls 88 of the cabinet housing 14. Similarly, the second evaporator cover 78 includes a vertical panel portion 78a extending downwardly from the top wall 86 and a horizontal panel portion 78b extending between the vertical panel portion 78a and the side walls 88. The vertical panel portions 76a, 78a and the horizontal panel portions 76b, 78b are formed from one or more thermally insulating panels, such as a hollow vacuum insulated panel (shown in FIG. 4). It will be understood that other types of insulating panels may be used in other embodiments of the invention, including but not limited to foam-based panels. Moreover, it will be understood that the first and second evaporator covers 76, 78 may be combined into a unitary insulated evaporator cover in other embodiments of the invention.

As shown in FIG. 3, the first evaporator compartment 80 is defined as a generally rectilinear space by the corresponding vertical panel portion 76a, the horizontal panel portion 76b, the side walls 88, the top wall 86, and an insulated divider wall 92 located between the first evaporator compartment 80 and the second evaporator compartment 82. The first evaporator 32 mounts into a first sub-divider panel 94 located generally centrally within the first evaporator compartment 80 so as to divide the first evaporator compartment 80 into an inlet side 96 and an outlet side 98.

In a similar manner, the second evaporator compartment 82 is defined as a generally rectilinear space by the corresponding vertical panel portion 78a, the horizontal panel portion 78b, the side walls 88, the top wall 86, and the insulated divider wall 92. The second evaporator 34 mounts into a second sub-divider panel 100 located generally centrally within the second evaporator compartment 82 so as to divide the second evaporator compartment 82 into an inlet side 102 and an outlet side 104. The divider wall 92 and each of the first and second sub-divider panels 94, 100 are formed from a vacuum insulated panel or a foam-based insulated panel in this embodiment, although it will be understood that other types of insulated panels may also be used in other embodiments.

The horizontal panel portion 76b of the first evaporator cover 76 includes an inlet aperture 106 on the inlet side 96 of the first sub-divider panel 94 and an outlet aperture 108 on the outlet side 98 of the first sub-divider panel 94. The at least one first damper includes the inlet first damper 66a that includes an insulated panel that is operable to rotate to open or close flow through the inlet aperture 106 between the inlet side 96 and the refrigerated interior 18 of the cabinet 12. Similarly, the at least one first damper also includes the outlet first damper 66b which includes an insulated panel that is operable to rotate to open or close flow through the outlet aperture 108 between the outlet side 98 and the refrigerated interior 18 of the cabinet 12. Thus, the inlet first damper 66a and the outlet first damper 66b may be operated as respective portions of a first damper assembly to enable flow through the first evaporator 32.

The horizontal panel portion 78b of the second evaporator cover 78 also includes an inlet aperture 110 on the inlet side 102 of the second sub-divider panel 100 and an outlet aperture 112 on the outlet side 104 of the second sub-divider panel 100. The at least one third damper includes the inlet third damper 72a which includes an insulated panel that is operable to rotate to open or close flow through the inlet aperture 110 between the inlet side 102 and the refrigerated interior 18 of the cabinet 12. Similarly, the at least one third damper includes the outlet third damper 72b which includes an insulated panel that is operable to rotate to open or close flow through the outlet aperture 112 between the outlet side 104 and the refrigerated interior 18 of the cabinet 12. To this end, the inlet third damper 72a and the outlet third damper 72b may be operated as respective portions of a third damper assembly to enable flow through the second evaporator 34.

Figure 4:
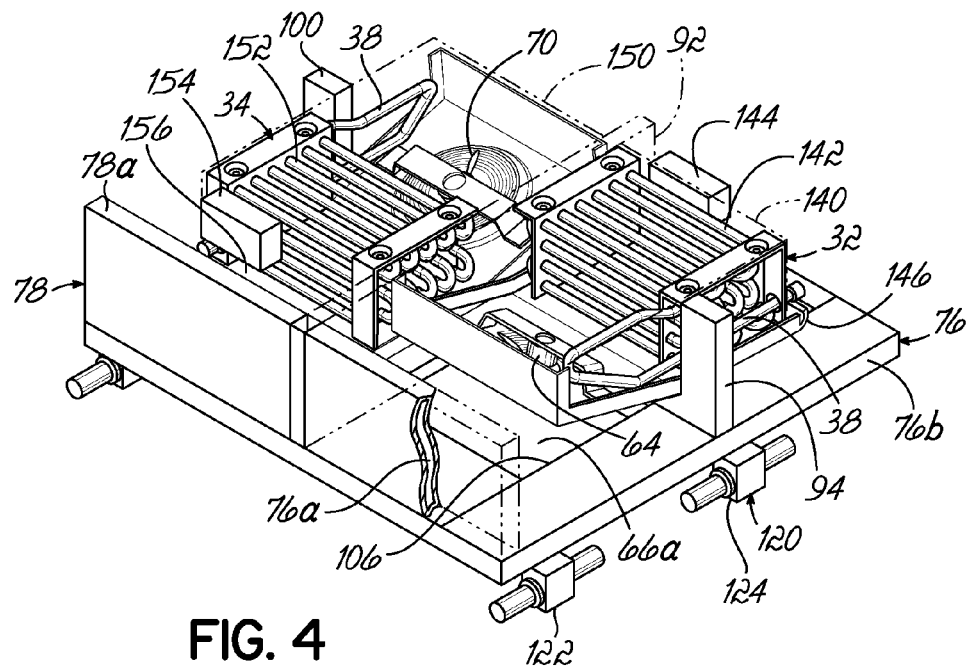
FIG. 4 is a perspective view of the evaporators used with the refrigerator of FIG. 1, with some of the side panels shown in phantom to reveal interior elements.

The divider wall 92 further includes a cross-flow aperture 114 that communicates between the outlet side 98 of the first evaporator compartment 80 and the inlet side 102 of the second evaporator compartment 82. The second damper 68 includes an insulated panel that is operable to rotate to open or close flow through the cross-flow aperture 114 (i.e., from the first evaporator 32 to the second evaporator 34). Additionally, FIG. 4 illustrates that the first and second evaporators 32, 34 are oriented in opposing directions with respect to one another such that flow exiting an back side of the first evaporator 32 may traverse the cross-flow aperture 114 and enter the front side of the second evaporator 34. It will be understood that the first and second evaporators 32, 34 may be oriented in the same direction or in other varying orientations in other embodiments within the scope of the invention.

Returning to FIG. 3, the first dampers 66a, 66b are operatively connected to a first damper drive mechanism 120 such as respective first and second servo motors 122, 124 and first and second drive shafts 126, 128. The control and operation of the first damper drive mechanism 120 is further described in detail with reference to FIG. 9 below. It will be understood that the second damper 68 is also driven by a similar damper drive mechanism that is not shown in FIG. 3. Similarly, the third dampers 72a, 72b are operatively connected to a third damper drive mechanism 130 such as respective third and fourth servo motors 132, 134 and third and fourth drive shafts 136, 138. The control and operation of the third damper drive mechanism 130 is further described in detail with reference to FIG. 9 below.

The first and second evaporators 32, 34 are shown in further detail in FIG. 4. To this end, the first evaporator 32 includes a first evaporator housing 140 enclosing a first evaporator coil 142 extending in a serpentine manner across a width of the first evaporator 32. The first evaporator coil 142 is operatively connected to the piping 38 of the refrigeration fluid circuit 20 (or 21), which carries liquid-phase refrigerant to the first evaporator coil 142 and removes vaporized and any remaining liquid-phase refrigerant from the first evaporator coil 142. The first evaporator fan 64 is mounted along the first evaporator housing 140 at the inlet side 96 of the first evaporator compartment 80 so as to actuate air flow through the first evaporator housing 140 and through the first evaporator coil 142. After flowing through the first evaporator coil 142, cooled air exits the first evaporator housing 140 and enters the outlet side 98 of the first evaporator compartment 80.

The first evaporator 32 also includes a first defrost heater 144 for removing frost build up on the first evaporator coil 142 as needed or on a regular basis. The first defrost heater 144 is shown mounted adjacent to the first evaporator coil 142 in FIGS. 4 and 6A-7B, but it will be appreciated that the first defrost heater 144 may be mounted anywhere within the first evaporator housing 140. The first defrost heater 144 is operated by the controller 50 and the control interface 52 previously described with reference to FIG. 2 to heat up the first evaporator coil 142 and melt any frost. The first evaporator housing 140 further includes a first drip pan 146 located below the first evaporator coil 142 and configured to collect and dispose of melted frost to a location outside the refrigerator 10. In this regard, the first drip pan 146 is generally angled from a horizontal orientation so that moisture dripping from the first evaporator coil 142 automatically flows to a moisture outlet (not shown).

In a similar manner, the second evaporator 34 includes a second evaporator housing 150 enclosing a second evaporator coil 152 extending in a serpentine manner across a width of the second evaporator 34. The second evaporator coil 152 is operatively connected to the piping 38 of the refrigeration fluid circuit 20, which carries liquid-phase refrigerant to the second evaporator coil 152 and removes vaporized and any remaining liquid-phase refrigerant from the second evaporator coil 152. The second evaporator fan 70 is mounted along the second evaporator housing 150 and generates air flow from the inlet side 102 of the second evaporator compartment 82 through the second evaporator coil 152 and to the outlet side 104 of the second evaporator compartment 82. The second evaporator 34 also includes a second defrost heater 154 for removing frost build up on the second evaporator coil 152 as needed or on a regular basis, and a second drip pan 156 located below the second evaporator coil 152 and configured to collect and dispose of melted frost to a location outside the refrigerator 10. The second evaporator 34 is generally identical in construction to the first evaporator 32, and therefore further explanation is unnecessary.

Figure 5A:
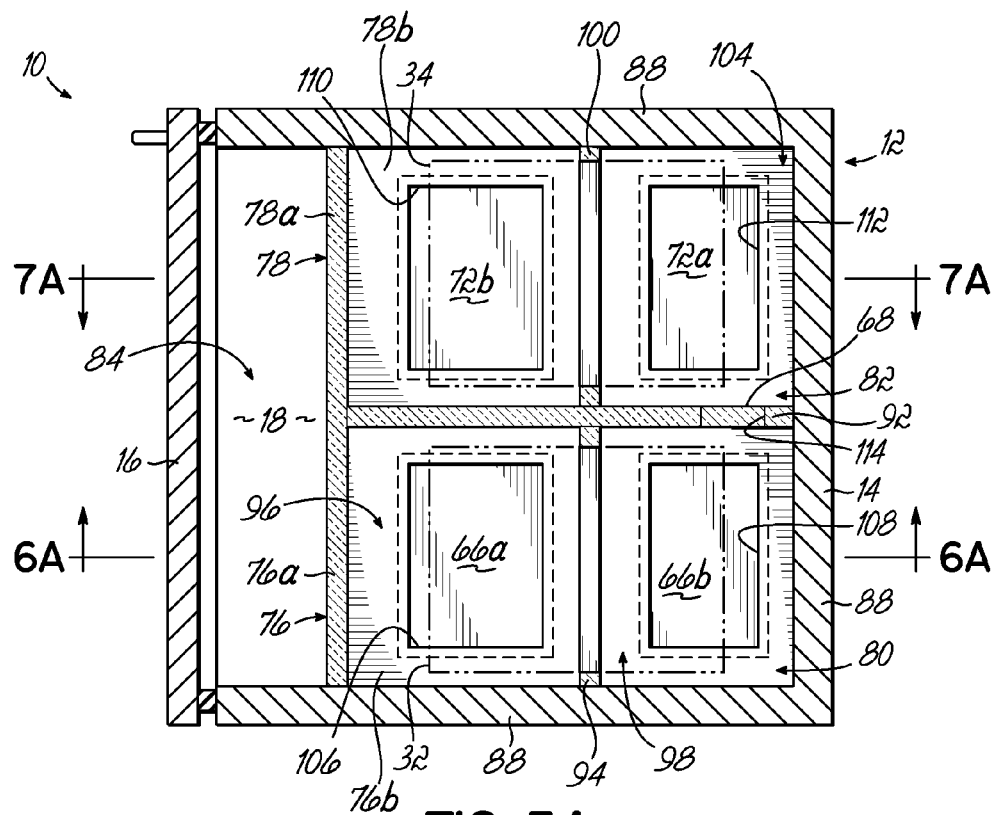
FIG. 5A is a cross-sectional top view of the refrigerator of FIG. 1 along line 5A-5A, with the dampers in a closed position.
Figure 5B:
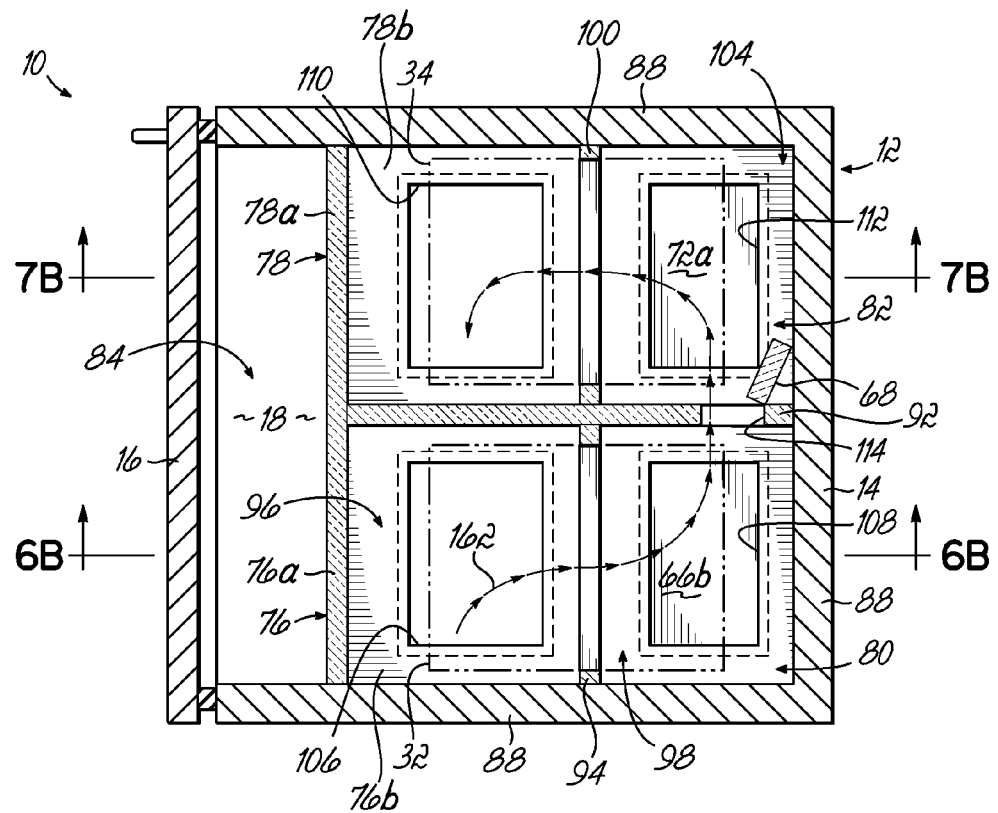
FIG. 5B is a cross-sectional top view of the refrigerator of FIG. 1 along line 5A-5A, with the dampers opened to enable flow through both evaporators.

As shown in FIGS. 5A and 5B, the first and second evaporator compartments 80, 82 are spaced rearward from the door 16 in this embodiment of the refrigerator. FIGS. 5A and 5B also more clearly illustrate how the divider wall 92 and the first and second sub-divider panels 94, 100 split the first and second evaporator compartments 80, 82. Two operating states of the refrigerator 10 are shown in FIGS. 5A and 5B. More specifically, each of the first, second, and third dampers 66a, 66b, 68, 72a, 72b are closed in FIG. 5A, which thermally isolates the first and second evaporator compartments 80, 82 from the refrigerated interior 18. In this state, both evaporators 32, 34 may be defrosted as no air flow is generated between the evaporator compartments 80, 82 and the refrigerated interior 18. The inlet first damper 66a, the second damper 68, and the outlet third damper 72b are opened in the state shown in FIG. 5B. These open dampers 66a, 68, 72b define a flow path shown by arrows 162 through the first and second evaporators 32, 34. More particularly, air flows from the refrigerated interior 18 through the first evaporator compartment 80 and the first evaporator 32, then through the divider wall 92 at cross-flow aperture 114, then through the second evaporator compartment 82 and the second evaporator 34, then back to the refrigerated interior 18. This arrangement of open and closed dampers is advantageous for the reasons described above, specifically that the first evaporator 32 tends to collect all moisture in the air in the cabinet 12 so that only the first evaporator 32 requires regular defrosting.

With reference to FIGS. 6A-7B, the refrigerator 10 further includes an upper compartment 160 located above the top wall 86 of the cabinet housing 14. The upper compartment 160 contains elements of the refrigeration fluid circuit 20, 21 other than the evaporators 32, 34 (e.g., the compressor 22, the condenser 24, etc.), thereby removing most of the space-using or heat generating components from the interior 18 of the cabinet 12. These other elements located within the upper compartment 160 are not shown in FIGS. 6A-7B, although they are schematically shown in FIGS. 2A-2B. The piping 38 for the refrigerant 40 extends through the top wall 86 to deliver refrigerant 40 between the components in the upper compartment 160 and the first and second evaporators 32, 34 in the cabinet 12.

FIGS. 6A-7B also illustrate the two operating states for the refrigerator 10 previously described with reference to FIGS. 5A and 5B. More particularly, in FIG. 6A the first dampers 66a, 66b and the second damper 68 are closed, which thermally isolates the first evaporator compartment 80 from the refrigerated portion 84. The first evaporator fan 64 is generally inactive when the first and second dampers 66a, 66b, 68 are closed because air cannot be circulated into and out of the first evaporator compartment 80. The first defrost heater 144 is only operated in this operational state of the refrigerator 10 so that substantially all of the heat energy generated by the first defrost heater 144 remains within the first evaporator compartment 80 during a defrost cycle or process. To this end, the temperature spike within the refrigerated portion 84 of the interior 18 is reduced or eliminated during the defrost cycle. In contrast, the inlet first damper 66a and the second damper 68 are open in FIG. 6B so that air from the refrigerated portion 84 may flow through the first evaporator 32 and the first evaporator coil 142 for cooling. The air flow actuated by the first evaporator fan 64 is schematically shown in FIG. 6B by arrows 162. Thus, relatively warm, moist air enters the first evaporator compartment 80 through the first inlet aperture 106 and relatively cool, dry air exits the first evaporator compartment 80 through the cross-flow aperture 114 in this operating state of the refrigerator 10. Note that the outlet first aperture 66b remains closed in this operating state so that the air flow exiting the first evaporator 32 is directed into the second evaporator compartment 82 for further cooling rather than the refrigerated interior 18.

Figure 7A:
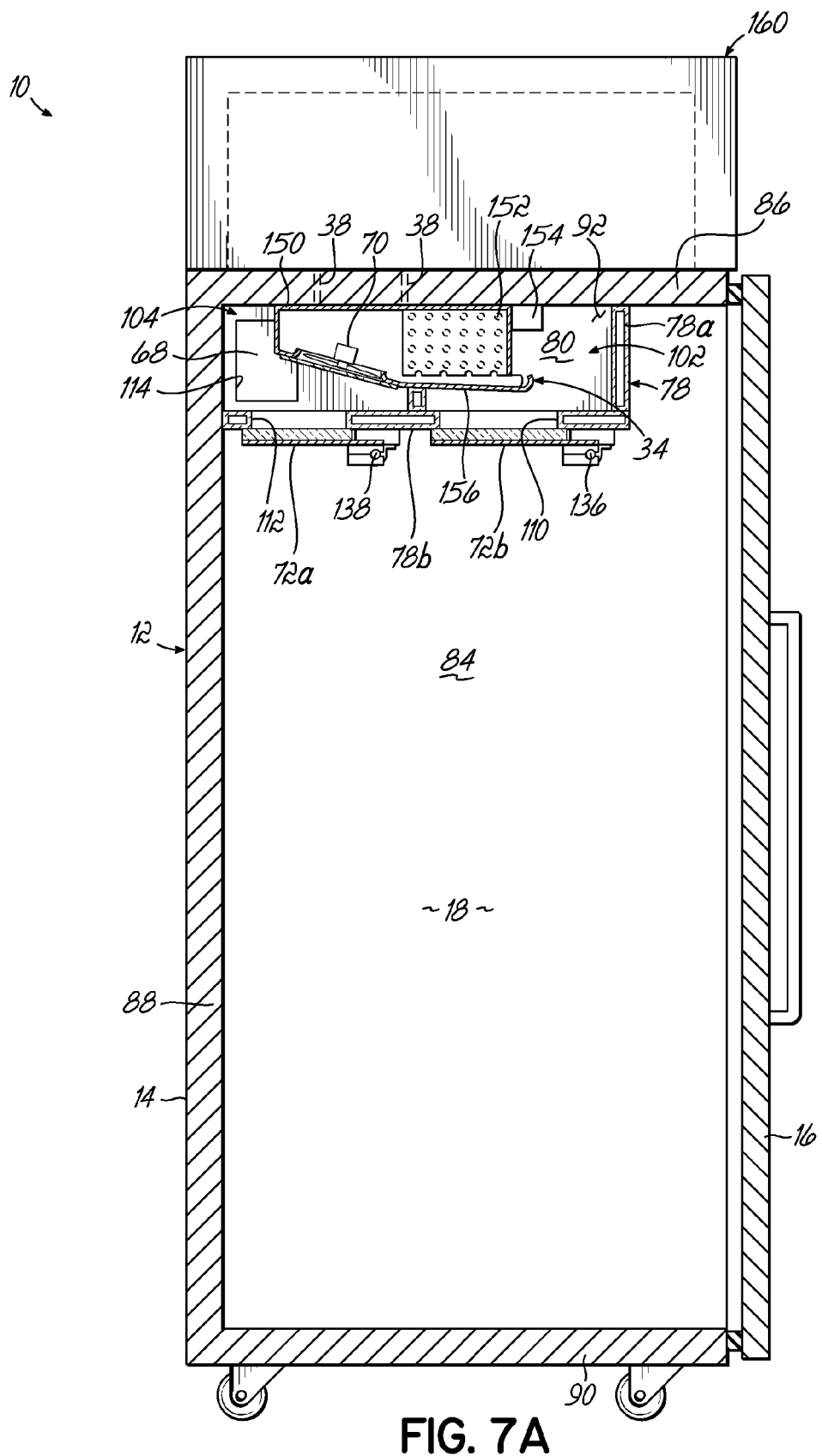
FIG. 7A is a cross-sectional side view of the refrigerator of FIG. 5A along line 7A-7A, with the dampers in a closed position.
Figure 7B:
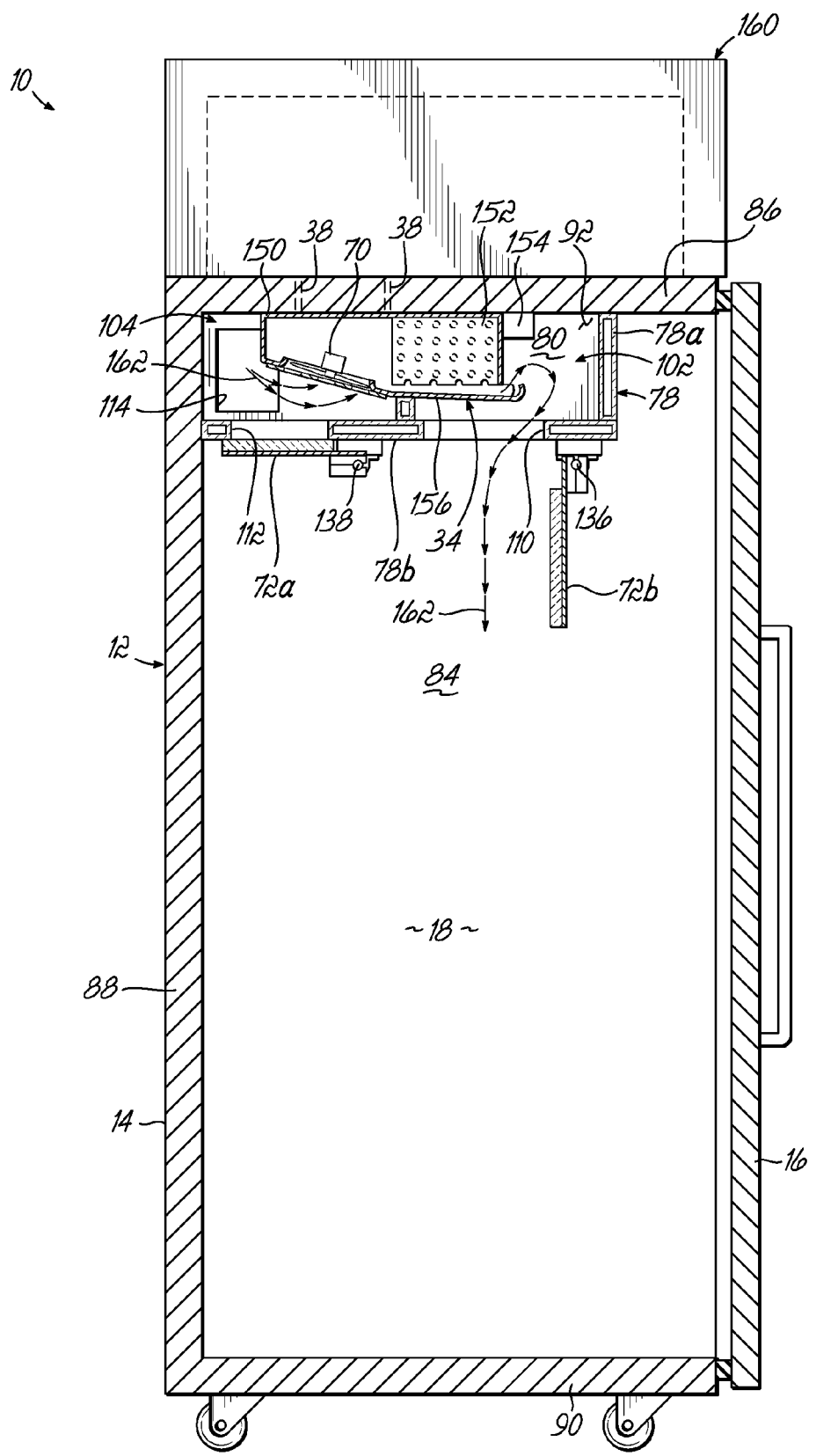
FIG. 7B is a cross-sectional side view of the refrigerator of FIG. 5B along line 7B-7B, with the dampers in an open position.

Similarly, in FIG. 7A the second and third 68, 72a, 72b are closed, which thermally isolates the second evaporator compartment 82 from the refrigerated portion 84. The second evaporator fan 70 is generally inactive when the second and third 68, 72a, 72b are closed because air cannot be circulated into and out of the second evaporator compartment 82. The second defrost heater 154 is only operated in this operational state of the refrigerator 10 so that substantially all of the heat energy generated by the second defrost heater 154 remains within the second evaporator compartment 82 during a defrost cycle or process. To this end, the temperature spike within the refrigerated portion 84 of the interior 18 is reduced or eliminated during the defrost cycle. As noted above, this defrost cycle of the second evaporator 34 is only required rarely because the first evaporator 32 collects the majority of the moisture in the air from the refrigerated interior 18. The second damper 68 and the outlet third damper 72b are open in FIG. 7B so that the relatively cool, dry air from the first evaporator compartment 80 may flow through the second evaporator 34 and the second evaporator coil 152 for cooling. The air flow actuated by the second evaporator fan 70 is schematically shown in FIG. 7B by arrows 162. Thus, relatively cool, dry air enters the second evaporator compartment 82 through the cross-flow aperture 114 and relatively cold air exits the second evaporator compartment 82 through the second outlet aperture 112 in this operating state of the refrigerator 10.

Figure 6A:
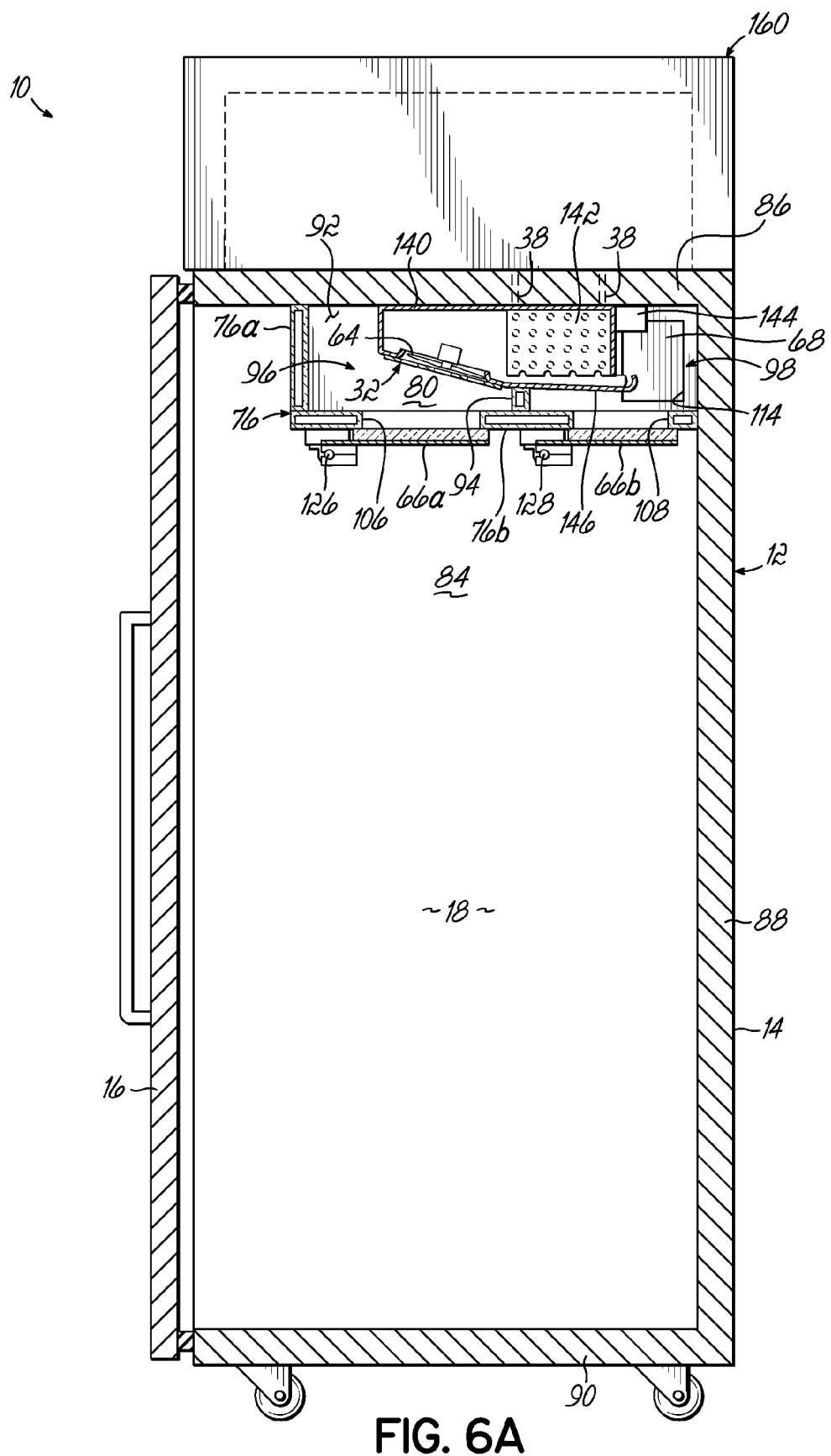
FIG. 6A is a cross-sectional side view of the refrigerator of FIG. 5A along line 6A-6A, with the dampers in a closed position.
Figure 6B:
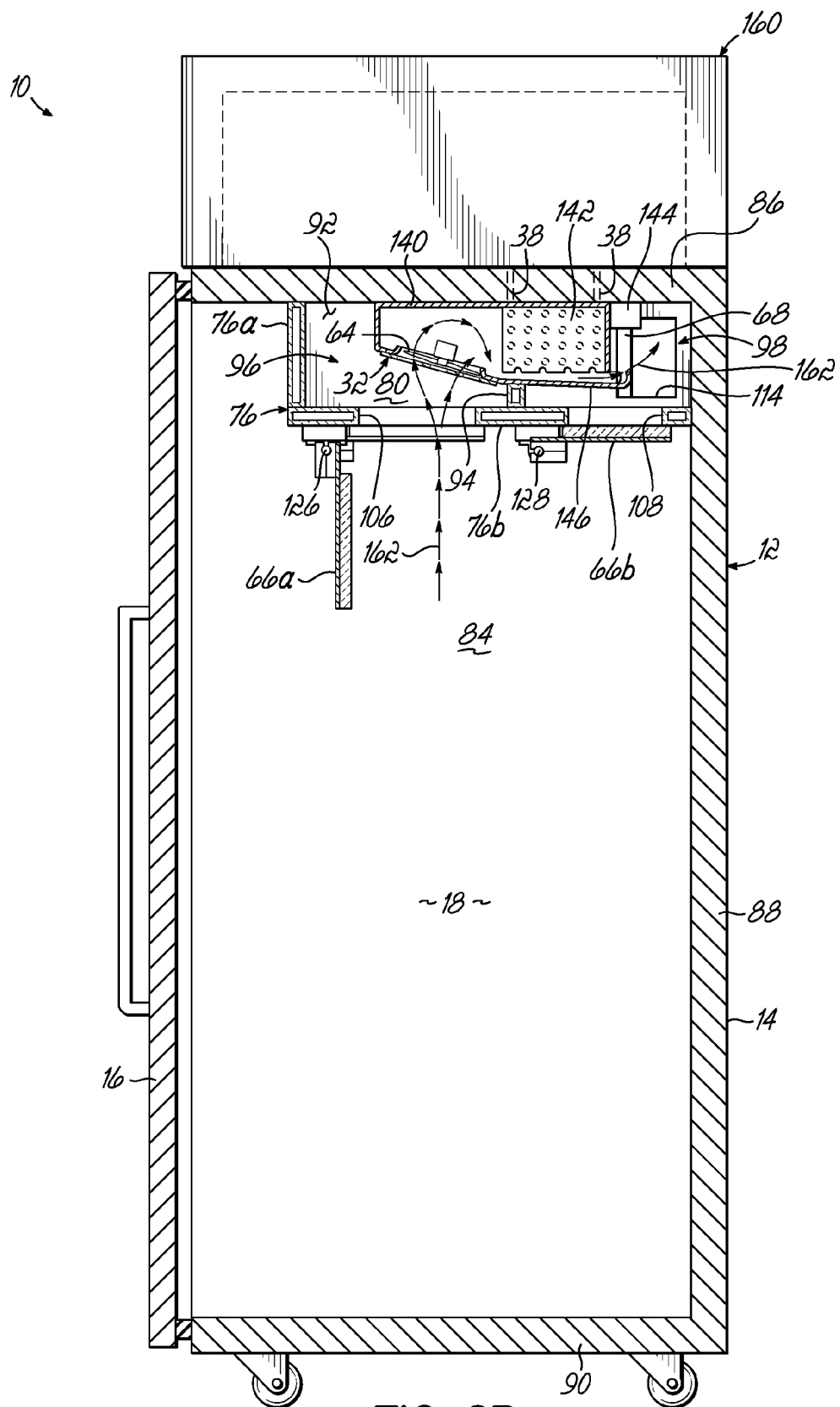
FIG. 6B is a cross-sectional side view of the refrigerator of FIG. 5B along line 6B-6B, with the dampers in an open position.
Figure 8A:
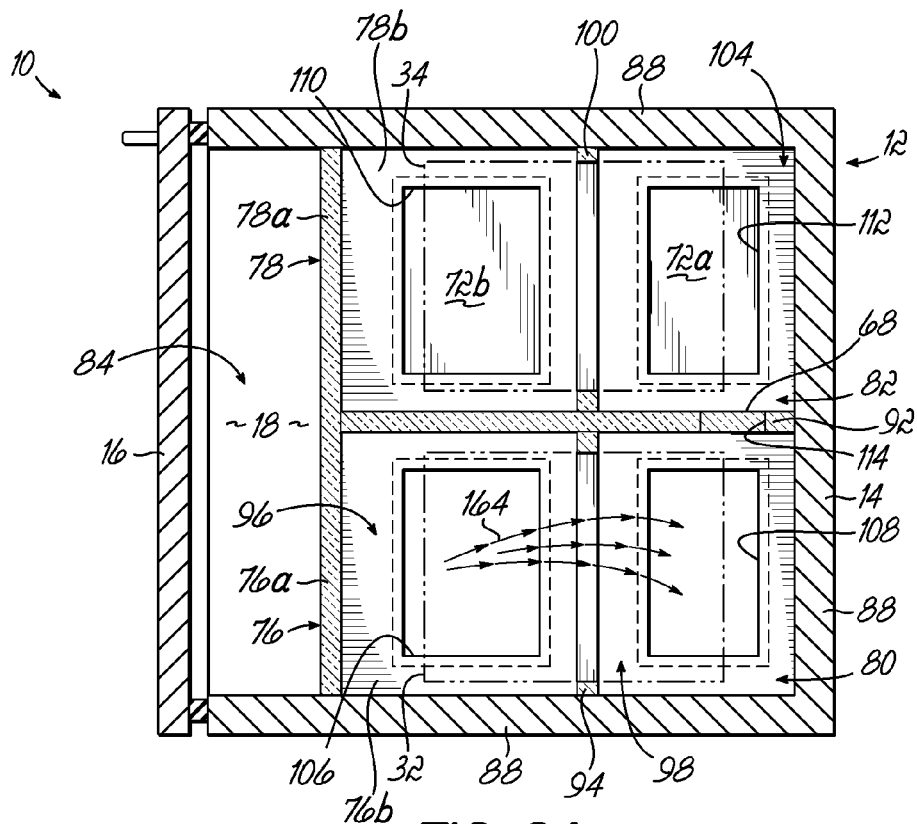
FIG. 8A is a cross-sectional top view of the refrigerator of FIG. 1 along line 5A-5A, with only the second evaporator open for air flow.
Figure 8B:
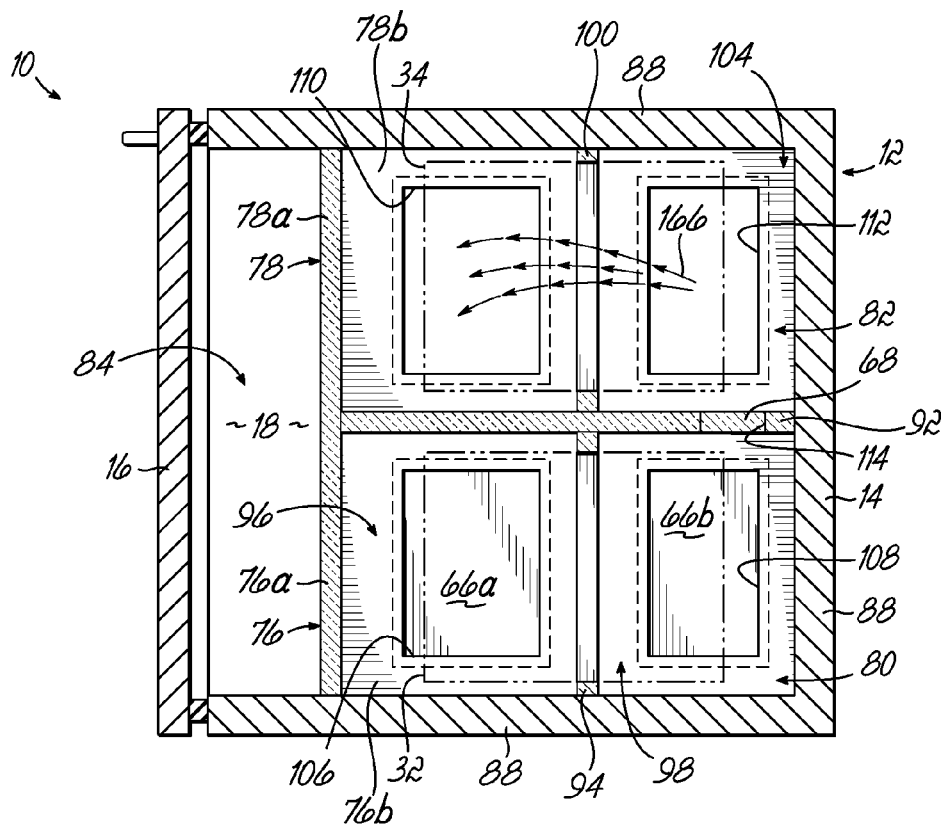
FIG. 8B is a cross-sectional top view of the refrigerator of FIG. 1 along line 5A-5A, with only the first evaporator open for air flow.

In summary, FIGS. 5A, 6A, and 7A collectively show the refrigerator 10 during a defrost cycle of both evaporators 32, 34, while FIGS. 5B, 6B, and 7B collectively show the refrigerator 10 during normal operation of both evaporators 32, 34. FIGS. 8A and 8B illustrate two more possible operational states for the refrigerator 10. To this end, in FIG. 8A the first dampers 66a, 66b are open while the second damper 68 and the third dampers 72a, 72b are closed. This operating state isolates only the second evaporator compartment 82 from the refrigerated interior 18, such as when the second evaporator 34 is to be defrosted alone. As a result, air continues to flow from the refrigerated interior 18 through the first evaporator compartment 80 for cooling as shown by flow arrows 164. Similarly, in FIG. 8B the third dampers 72a, 72b are open while the first dampers 66a, 66b and the second damper 68 are closed. This operating state isolates only the first evaporator compartment 80 from the refrigerated interior 18, such as when the first evaporator 32 is to be defrosted alone. As a result, air continues to flow from the refrigerated interior 18 through the second evaporator compartment 82 for cooling as shown by flow arrows 166. Thus, either evaporator 32, 34 may be run individually as well as in series in the refrigerator 10.

Figures 9, 10:
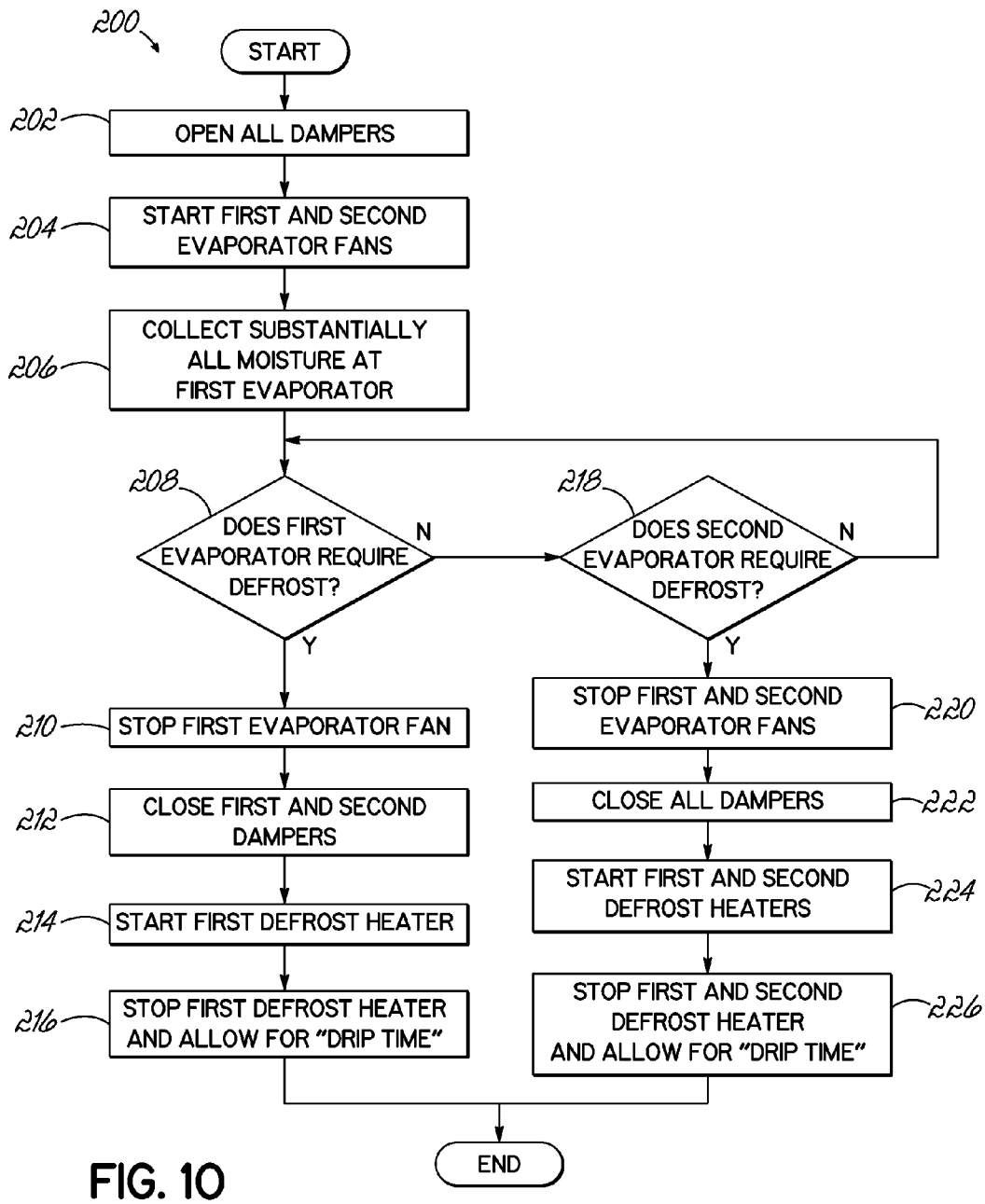
FIG. 9 is a schematic diagram of the controller and damper drive elements used with the refrigerator of FIG. 1.
FIG. 10 is a schematic flowchart illustrating an operational sequence of a controller associated with the refrigerator of FIG. 1.

FIG. 9 schematically illustrates the control and actuation mechanisms for the first, second, and third dampers 66a, 66b, 68, 72a, 72b. More specifically, the dampers 66a, 66b, 68, 72a, 72b are connected to the corresponding first and second damper drive mechanisms 120, 130, which are coupled to the controller 50. As understood in the art, the controller 50 may include at least one central processing unit ("CPU") coupled to a memory. Each CPU is typically implemented in hardware using circuit logic disposed on one or more physical integrated circuit devices or chips. Each CPU may be one or more microprocessors, micro-controllers, field programmable gate arrays, or ASICs, while memory may include random access memory (RAM), dynamic random access memory (DRAM), static random access memory (SRAM), flash memory, and/or another digital storage medium, and also typically implemented using circuit logic disposed on one or more physical integrated circuit devices, or chips. As such, memory may be considered to include memory storage physically located elsewhere in the refrigerator 10, e.g., any cache memory in the at least one CPU, as well as any storage capacity used as a virtual memory, e.g., as stored on a mass storage device such as a hard disk drive, another computing system, a network storage device (e.g., a tape drive), or another network device coupled to the controller 50 through at least one network interface by way of at least one network. The computing system, in specific embodiments, is a computer, computer system, computing device, server, disk array, or programmable device such as a multi-user computer, a single-user computer, a handheld computing device, a networked device (including a computer in a cluster configuration), a mobile telecommunications device, a video game console (or other gaming system), etc. The controller 50 includes at least one serial interface to communicate serially with an external device, such as the damper drive mechanisms 120, 130, for example. Thus, the controller 50 functions to actuate operation of the damper drive mechanisms 120, 130.

As previously described, the damper drive mechanisms 120, 130 may include one or more servo motors 122, 124, 132, 134 connected to the dampers 66a, 66b, 72a, 72b via corresponding drive shafts 126, 128, 136, 138. However, the damper drive mechanisms 120, 130 may include other types of actuation mechanisms and devices in other embodiments. For example, the damper drive mechanisms 120, 130 may be hydraulically driven, pneumatically driven, or mechanically driven such as by various types of motors. The damper drive mechanisms 120, 130 may be configured to rotate the dampers 66a, 66b, 72a, 72b between open and closed positions as shown in the illustrated embodiment, but it will be understood that the damper drive mechanisms 120, 130 may alternatively slide or otherwise move the dampers 66a, 66b, 72a, 72b (and 68) in non-rotational manners as well.

An exemplary operation of the refrigerator 10 is shown schematically in the flowchart of FIG. 10. In this regard, the controller 50 is operable to command the refrigerator 10 to execute the steps of the method 200 shown in that Figure. To this end, the controller 50 opens all dampers 66a, 68, 72b associated with the normal flow path through the first evaporator compartment 80 and also the second evaporator compartment 82 before returning to the refrigerated portion 84, at step 202. This operating state is also shown in FIG. 5B. The controller 50 then starts the first and second evaporator fans 64, 70 at step 204. The first evaporator 32 acts as a sacrificial evaporator that collects substantially all moisture in the air flow through the first evaporator compartment 80 at step 206.

The controller 50 then determines whether a defrost cycle is necessary for the first evaporator 32 at step 208. For example, in a time-based defrost cycle, the controller 50 at step 208 determines whether a predetermined amount of time has elapsed since the most recent defrost cycle of the first evaporator 32. If so, then the controller 50 begins the defrost cycle for the first evaporator 32 at step 210. If not, then the controller 50 moves to step 218 to check whether the second evaporator 34 requires a defrost cycle, as described in further detail below. In one example, the refrigerator 10 may defrost every six hours, in which case the predetermined amount of time would be six hours. Alternatively, the controller 50 may be operable to perform adaptive defrosts that are spaced by varying amounts of time depending on operational characteristics measured between defrost cycles, as described in further detail below.

Returning to FIG. 10, when a defrost cycle is required to remove frost build up from the first evaporator coil 142, the controller 50 stops operation of the first evaporator fan 64 at step 210. The controller 50 then closes the first and second dampers 66a, 68 at step 212 to thermally isolate the first evaporator compartment 80 from the refrigerated portion 84 of the cabinet 12. These steps stop air flow through the first evaporator 32, and it will be understood that the refrigerant 40 flow may also be selectively stopped by the first bypass valve 42 or the three-way valve 46, depending on the embodiment of the refrigeration fluid circuit 20, 21. With the first evaporator compartment 80 thermally isolated from the remainder of the cabinet 12, the controller 50 starts operation of the first defrost heater 144 at step 214. The first defrost heater 144 warms the first evaporator 32 and the first evaporator coil 142 to melt frost and cause the moisture to drip onto the first drip pan 146 for removal from the first evaporator 32. The operational state of the refrigerator 10 at this point is shown in FIG. 6A.

One of the sensors $S_3$ connected to the first evaporator 32 may be configured to measure the temperature of the first evaporator 32. Once the controller 50 determines that the first evaporator 32 has been heated to a first target temperature above the freezing point of water (0° C.) for a sufficient time to melt frost build up on the first evaporator coil 142, the controller 50 stops the first defrost heater 144 at step 216 and allows for a set period of "drip time" in which additional moisture drips off the first evaporator coil 142 into the first drip pan 146. In one example, this first target temperature may be about 10° C. After this "drip time" has occurred, the controller 50 may direct refrigerant 40 and air through both of the first and second evaporators 32, 34 again in normal operation as described above. As a result of the first evaporator cover 76 and the continued operation of the second evaporator 34, the defrost cycle does not cause a significant temperature spike within the refrigerated interior 18 of the cabinet 12, and the refrigerator 10 therefore is advantageous over conventional refrigerator designs.

Returning to step 218, the controller 50 determines whether a defrost cycle is necessary for the second evaporator 34 (and also the first evaporator 32). For example, in a time-based defrost cycle, the controller 50 at step 218 determines whether a predetermined amount of time has elapsed since the most recent defrost cycle of the second evaporator 34. If so, then the controller 50 begins the defrost cycle for the first and second evaporators 32, 34 at step 220. If not, then the controller 50 returns to step 208 and continues to wait and periodically check to see if the predetermined amount of time has elapsed for either the first evaporator 32 or both evaporators 32, 34. For a time-based defrost cycle, the refrigerator 10 may defrost the first evaporator 32 every six hours and the second evaporator 34 every 48 hours. Alternatively, the controller 50 may be operable to perform adaptive defrosts that are spaced by varying amounts of time depending on operational characteristics measured between defrost cycles.

When a defrost cycle is required to remove frost build up from the second evaporator coil 152, the controller 50 stops operation of the first and second evaporator fans 64, 70 at step 220. The controller 50 then closes each of the dampers 66a, 68, 72b at step 222 to thermally isolate the first and second evaporator compartments 80, 82 from the refrigerated portion 84 of the cabinet 12. These steps stop air flow through the first and second evaporators 32, 34. With the first and second evaporator compartments 80, 82 thermally isolated from the remainder of the cabinet 12, the controller 50 starts operation of the first and second defrost heaters 144, 154 at step 224. The second defrost heater 154 warms the second evaporator 34 and the second evaporator coil 152 to melt frost and cause the moisture to drip onto the second drip pan 156 for removal from the second evaporator 34. The operational state of the refrigerator 10 at this point is shown in FIG. 7A (and FIG. 6A).

Once the controller 50 determines that the first and second evaporators 32, 34 have been heated to a first target temperature above the freezing point of water (0° C.) for a sufficient time to melt frost build up on the first and second evaporator coils 142, 152, the controller 50 stops the first and second defrost heaters 144, 154 at step 226 and allows for a set period of "drip time" in which additional moisture drips off the first and second evaporator coils 142, 152 into the corresponding drip pans 146, 156. In one example, this first target temperature may be about 10° C. After this "drip time" has occurred, the controller 50 may direct refrigerant 40 and air through both of the first and second evaporators 32, 34 again in normal operation as described above. As a result of the first evaporator cover 76 and the second evaporator cover 78, the defrost cycle does not cause a significant temperature spike within the refrigerated interior 18 of the cabinet 12.

As briefly noted above, in one alternative embodiment the defrost cycle will be an adaptive defrost cycle selectively actuated at steps 208 and 218 of the method 200. In this adaptive defrost cycle, the period between defrost cycles and the time duration of the defrost cycles are modified based on a plurality of operational parameters monitored by the controller 50. For example, the conventional time-based defrost cycle may operate the first and second defrost heaters 144, 154 at regular periodic intervals. By contrast, the adaptive defrost cycle may monitor the actual temperature being maintained in the cabinet 12, as well as the number of door openings and amount of total time the door 16 is open. These and other factors are considered to determine how long the period should be before the next defrost cycle is started, and also how long the first and second defrost heaters 144, 154 should be operated in the next defrost cycle. In this regard, if the door 16 of the cabinet 12 is not opened often during a six hour period and the first and/or second evaporators 32, 34 are having little trouble maintaining the desired temperature within the refrigerated portion 84, then the next defrost cycle may be delayed by an additional number of hours and/or shortened in duration. Thus, the adaptive defrost cycle is highly energy efficient because the first and second evaporator coils 142, 152 are only defrosted when that cycle becomes necessary. Moreover, the adaptive defrost cycle automatically adjusts the refrigerator 10 for proper and efficient operation in a variety of environmental conditions.

While the present invention has been illustrated by a description of an exemplary embodiment and while this embodiment has been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A refrigerator, comprising:
   a cabinet having a refrigerated interior;
   a refrigeration fluid circuit for circulating a refrigerant, the refrigeration fluid circuit including a compressor, a condenser, an expansion device, a first evaporator located within the cabinet, and a second evaporator located within the cabinet;
   the first evaporator including a first evaporator coil and a first evaporator fan producing air flow through the first evaporator coil, the second evaporator including a second evaporator coil and a second evaporator fan producing air flow through the second evaporator coil;
   an insulating cover separating the refrigerated interior from a first evaporator compartment containing the first evaporator and a second evaporator compartment containing the second evaporator, the first and second evaporator compartments being adjacent to one another and divided from one another by divider wall, and each of the first and second evaporator compartments being divided into an inlet side and an outlet side on opposite sides of the respective first and second evaporator compartments;
   at least one first damper that opens to permit air circulation from the refrigerated interior into the fist evaporator compartment, the at least one first damper including an inlet first damper between the refrigerated interior and the inlet side of the first evaporator compartment, and an outlet first damper between the refrigerated interior and the outlet side of the first evaporator compartment;
   a second damper associated with the divider wall that opens to permit air circulation from the outlet side of the first evaporator compartment into the inlet side of the adjacent second evaporator compartment via operation of the second damper so as to permit air flow through the divider wall; and
   at least one third damper that opens to permit air circulation from the second evaporator compartment into the refrigerated interior, the at least one third damper including an inlet third damper between the refrigerated interior and the inlet side of the second evaporator compartment, and an outlet third damper between the refrigerated interior and the outlet side of the second evaporator compartment, wherein the first evaporator operates with refrigerant at a colder temperature than the second evaporator, and operation of the first and second evaporator fans force warmed air from the refrigerated interior to flow past the first evaporator before flowing past the second evaporator and then back to the refrigerated interior by opening the inlet first damper, the second damper, and the outlet third damper while keeping the outlet first damper and the inlet third damper closed during fan operation, such that the first evaporator collects substantially all frost formed on the first and second evaporator coils during cooling of the refrigerated interior.

2. The refrigerator of claim 1, wherein the first evaporator further includes a first defrost heater, and the refrigerator further comprises:

a controller operable to command the refrigerator to perform the following steps when the first evaporator requires defrosting:
stop operation of the first evaporator fan;
close the inlet first, outlet first and second dampers to isolate the first evaporator compartment from the refrigerated interior; and
after closing the inlet first, outlet first and second dampers, start operation of the first defrost heater.

3. The refrigerator of claim 2, wherein the second evaporator further includes a second defrost heater, and the controller is operable to command the refrigerator to perform the following steps when the first and second evaporators require defrosting:
stop operation of the first and second evaporator fans;
close the inlet first, outlet first, second, inlet third, and outlet third dampers to isolate the first evaporator compartment and the second evaporator compartment from the refrigerated interior; and
after closing the inlet first, outlet first, second, inlet third, and outlet third dampers, start operation of the first and second defrost heaters.

4. The refrigerator of claim 3, wherein the controller is operable to modify an amount of time between defrost cycles and to modify an amount of time the first or second defrost heater is operating during a defrost cycle based on at least one measurable operating parameter.

5. The refrigerator of claim 1, wherein the expansion device includes at least one of a capillary tube or a valve.

6. The refrigerator of claim 1, wherein the first and second evaporators are coupled in parallel to one another in the refrigeration fluid circuit.

7. The refrigerator of claim 1, wherein the first and second evaporators are coupled in series with one another in the refrigeration fluid circuit.

8. The refrigerator of claim 1, wherein the refrigeration fluid circuit further includes an accumulator operatively connected to the first and second evaporators and the compressor.

9. The refrigerator of claim 1, wherein the refrigeration fluid circuit further includes a dryer operatively connected to the condenser and the expansion device.

10. The refrigerator of claim 2, wherein positioning the inlet third damper in an open position and the outlet third damper in an open position is configured to enable the second evaporator to continue cooling the refrigerated interior while the first evaporator is being defrosted.

11. The refrigerator of claim 2, wherein positioning the inlet first damper in an open position and the outlet first damper in an open position is configured to enable the first evaporator to continue cooling the refrigerated interior while the second evaporator is being defrosted.

12. The refrigerator of claim 1, wherein the insulating cover includes a plurality of insulated panels separating the refrigerated interior from the first and second evaporator compartments.

13. A method of operating a refrigerator including a cabinet having a refrigerated interior; a refrigeration fluid circuit including a compressor, a condenser, a first evaporator located within the cabinet and having a first evaporator fan, and a second evaporator located within the cabinet and having a second evaporator fan, wherein the first and second evaporators are located in adjacent first and second evaporator compartments, each of which is separated from the refrigerated interior by an insulating cover, the first and second evaporator compartments separated by a divider wall; an inlet first damper and an outlet first damper selectively permitting air circulation between the refrigerated interior and the first evaporator compartment; a second damper being associated with the divider wall and selectively permitting air circulation from the first evaporator compartment into the second evaporator compartment; and an inlet third damper and an outlet third damper selectively permitting air circulation between the second evaporator compartment and the refrigerated interior, and the method comprises:

opening the inlet first, second, and outlet third dampers while keeping the outlet first damper and the inlet third damper closed, thereby enabling flow of air from the first evaporator compartment to the second evaporator compartment via the second damper;

generating air flow with the first and second evaporator fans to cool the refrigerated interior with the first and second evaporators, thereby forcing warmed air from the refrigerated interior with the first and second evaporator fans to flow past the first evaporator before flowing past the second evaporator and then back to the refrigerated interior; and supplying the first evaporator with refrigerant at a lower temperature than refrigerant supplied to the second evaporator such that the first evaporator collects substantially all frost that forms on the first and second evaporators, thereby reducing a required frequency of defrost cycles for the second evaporator.

14. The method of claim 13, wherein the first evaporator includes a first defrost heater, and the method further comprises:

when the first evaporator requires defrosting, stopping the first evaporator fan;

closing the inlet first, outlet first and second dampers to thermally isolate the first evaporator from the refrigerated interior; and after closing the inlet first, outlet first and second dampers, starting operation of the first defrost heater.

15. The method of claim 14, wherein the second evaporator includes a second defrost heater, and the method further comprises:

when the second evaporator requires defrosting, stopping the first and second evaporator fans;

closing the inlet first, outlet first, second, inlet third, and outlet third dampers to thermally isolate the first and second evaporators from the refrigerated interior; and after closing the inlet first, outlet first, second, inlet third, and outlet third dampers, starting operation of the first and second defrost heaters.

16. The method of claim 14, wherein when the first evaporator requires defrosting, the method further comprises:
  opening the inlet third damper to permit warmed air flow from the refrigerated interior to be drawn into the second evaporator by the second evaporator fan;
  opening the outlet third damper to permit cooled air flow from the second evaporator to flow into the refrigerated interior as forced by the second evaporator fan; and
  continuing to cool the refrigerated interior with the second evaporator while the first evaporator is defrosted.

17. The method of claim 13, wherein the second evaporator includes a second defrost heater, and wherein when the second evaporator requires defrosting, the method further comprises:
  stopping the second evaporator fan;
  closing the second, the inlet third, and the outlet third dampers to thermally isolate the second evaporator from the refrigerated interior;
  after closing the second, the inlet third, and the outlet third dampers, starting operation of the second defrost heater;
  opening the inlet first damper to permit warmed air flow from the refrigerated interior to be drawn into the first evaporator by the first evaporator fan;
  opening the outlet first damper to permit cooled air flow from the first evaporator to flow into the refrigerated interior as forced by the first evaporator fan; and
  continuing to cool the refrigerated interior with the first evaporator while the second evaporator is defrosted.

18. The refrigerator of claim 1, wherein the refrigerator includes only a single second damper selectively opening to permit flow directly between the first and second evaporator compartments.

* * * * *

UNITED STATES PATENT AND TRADEMARK OFFICE
CERTIFICATE OF CORRECTION

| | | |
|---|---|---|
| PATENT NO. | : 9,310,121 B2 | |
| APPLICATION NO. | : 13/652979 | |
| DATED | : April 12, 2016 | |
| INVENTOR(S) | : Bonet | |

It is certified that error appears in the above-identified patent and that said Letters Patent is hereby corrected as shown below:

In the specification,

At Column 8, line 29, delete "another such that flow exiting an back side of the first evapo-" and add -- another such that flow exiting a back side of the first evapo- --

At Column 8, line 39, delete "the first damper drive mechanism 120 is further described in" and add -- the first damper drive mechanism 120 are further described in --

At Column 8, line 47, delete "mechanism 130 is further described in detail with reference to" and add -- mechanism 130 are further described in detail with reference to limit --

At Column 9, line 44, delete "66b, 68, 72a, 72b are closed in FIG. 5A, which thermally" and add -- 66b, 68, 72a, 72b is closed in FIG. 5A, which thermally --

At Column 10, line 39, delete "Similarly, in FIG. 7A the second and third 68, 72a, 72b are" and add -- Similarly, in FIG. 7A the second and third dampers 68, 72a, 72b are --

At Column 10, line 43, delete "third 68, 72a, 72b are closed because air cannot be circulated" and add -- third dampers 68, 72a, 72b are closed because air cannot be circulated --

In the claims,

At claim 1, Column 14, line 45, delete "and divided from one another by divider wall, and each" and add -- and divided from one another by a divider wall, and each --

At claim 1, Column 14, line 51, delete "from the refrigerated interior into the fist evaporator" and add -- from the refrigerated interior into the first evaporator --

At claim 1, Column 15, line 6, delete "operation of the first and second evaporator fans force" and add -- operation of the first and second evaporator fans forces --

Signed and Sealed this
Twelfth Day of July, 2016

Michelle K. Lee
*Director of the United States Patent and Trademark Office*